United States Patent [19]
Rao et al.

[11] Patent Number: 5,790,704
[45] Date of Patent: Aug. 4, 1998

[54] IMAGE PROCESSING APPARATUS FOR PERFORMING RANDOM MASK PROCESS

[75] Inventors: Gururaj Rao; Hiroki Kanno, both of Yokohama, Japan

[73] Assignee: Kabushiki Kaisha Toshiba, Kanagawa-ken, Japan

[21] Appl. No.: 617,545

[22] Filed: Mar. 18, 1996

[30] Foreign Application Priority Data

Mar. 24, 1995 [JP] Japan .................. 7-066076

[51] Int. Cl.$^6$ ........................... H04N 7/405
[52] U.S. Cl. .............. 382/237; 382/252; 358/456; 358/458
[58] Field of Search ............... 382/237, 270, 382/252; 358/456, 457, 458, 465, 466

[56] References Cited

U.S. PATENT DOCUMENTS

| | | | |
|---|---|---|---|
| 4,449,150 | 5/1984 | Kato | 358/456 |
| 5,107,346 | 4/1992 | Bowers et al. | 358/458 |
| 5,530,561 | 6/1996 | Shimazaki | 358/465 |
| 5,577,136 | 11/1996 | Tanioka et al. | 382/270 |

FOREIGN PATENT DOCUMENTS 6-54173  2/1994  Japan .................. H04N 1/40

OTHER PUBLICATIONS

Robert Ulichney, "Digital Halftoning", The MIT Press, 1987.

1995 General Meeting of Institute of Electronic Information and Communication, Fukuoka, Japan, Mar. 1995. "Error Diffusion Method By Bit-Mask Error Filtering", D-473, G. Rao et al.

*Primary Examiner*—Scott A. Rogers
*Attorney, Agent, or Firm*—Limbach & Limbach L.L.P.

[57] ABSTRACT

An image processing apparatus includes a circuit for correcting a first image data of a target pixel corresponding to a correction amount, a circuit for generating a third image data on the basis of the second image data and a preset threshold value, the third image data having a gradation value less than one of the second image data, a circuit for comparing the second image data with the third image data to output a difference value therebetween, and a circuit for deriving the correction amount, based on the difference value to randomly diffuse the difference value to the peripheral portion of the target pixel and supplying the correction amount to the correcting circuit.

15 Claims, 15 Drawing Sheets

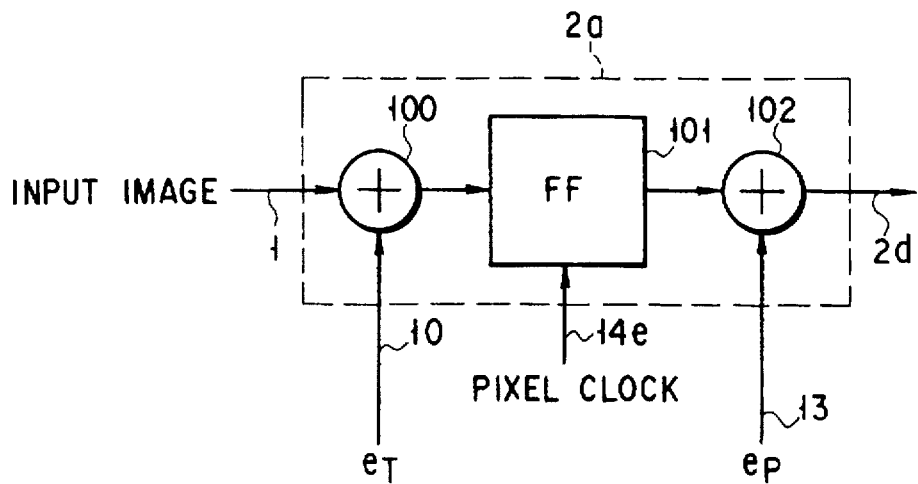
F I G. 2A
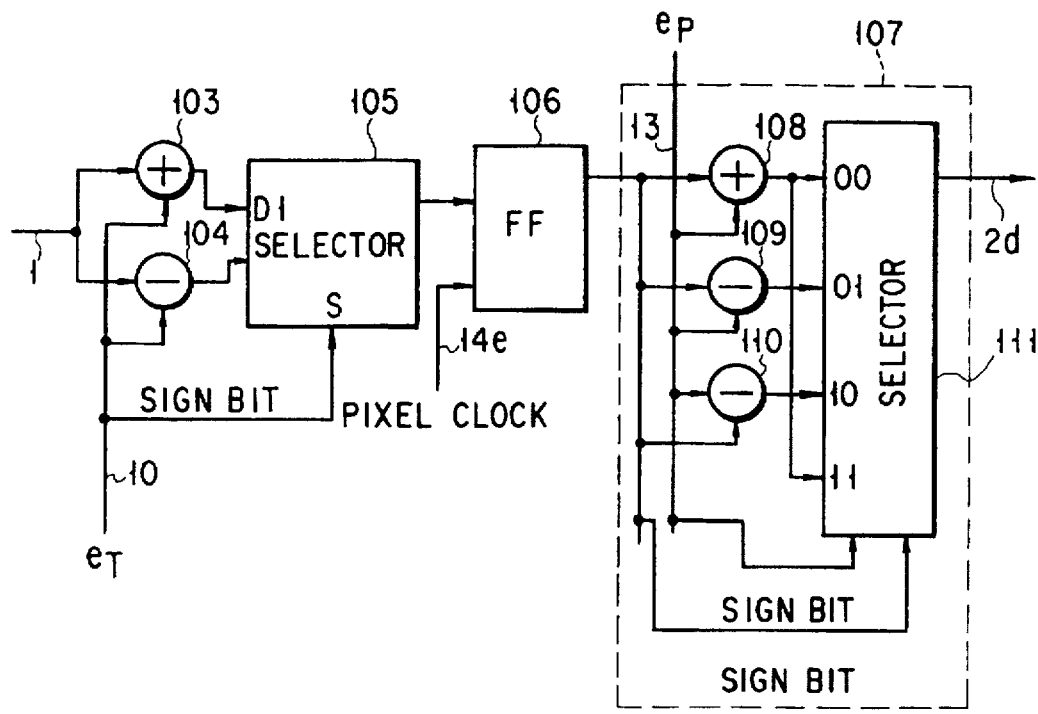
F I G. 2B

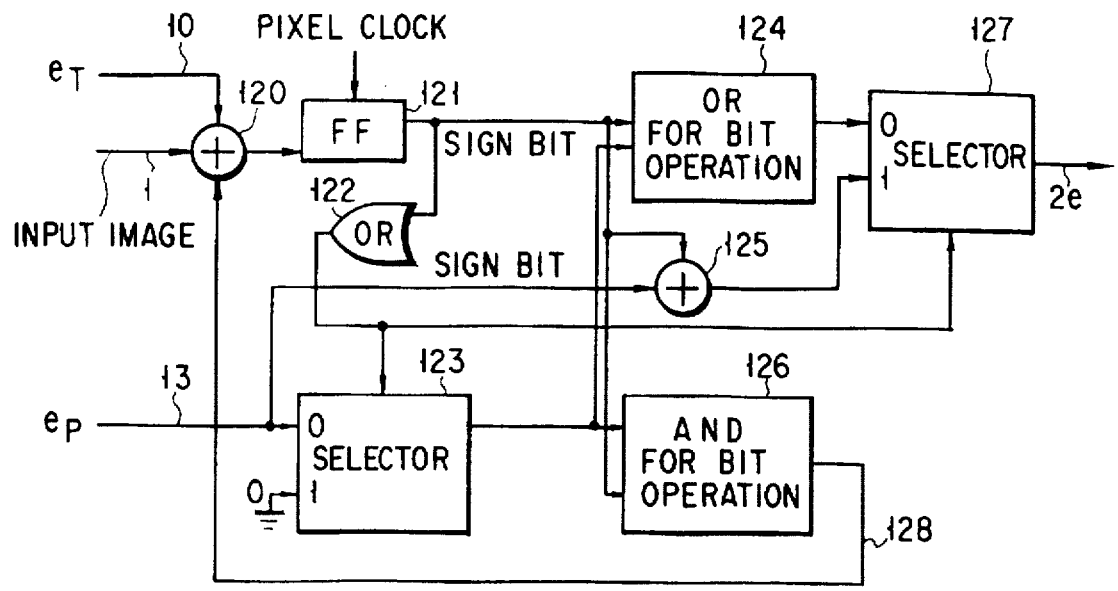
F I G. 3A
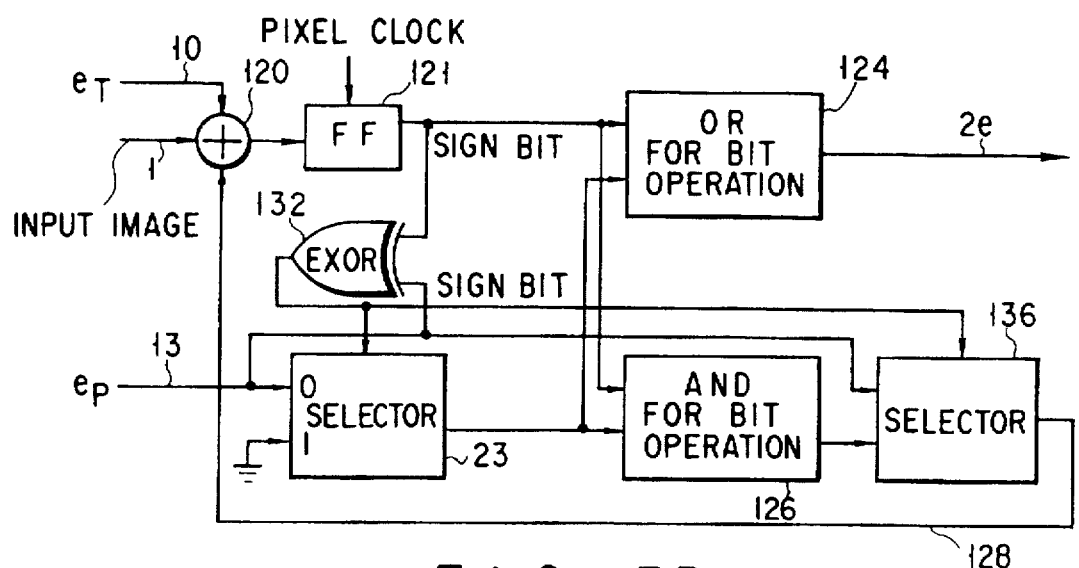
F I G. 3B

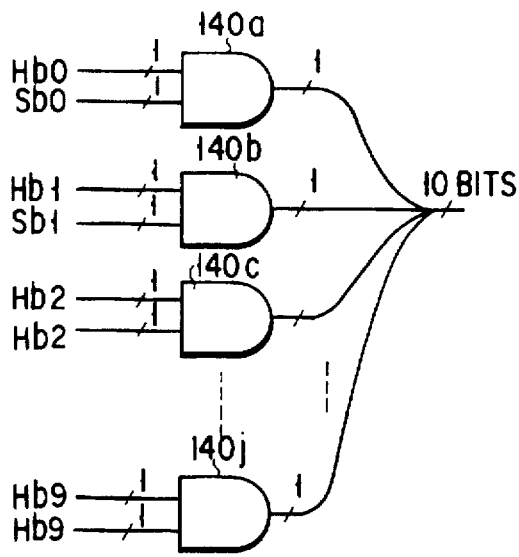
F I G. 4A
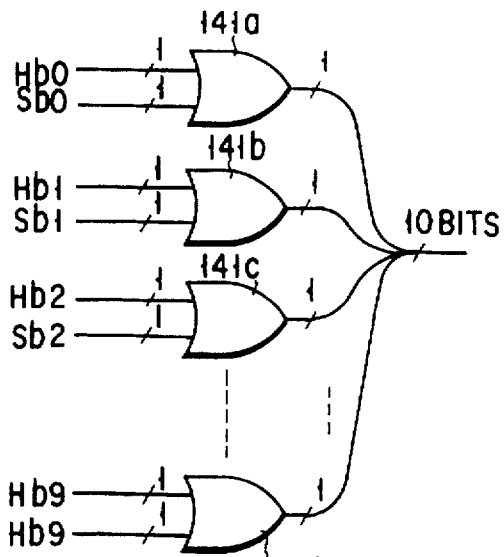
F I G. 4B
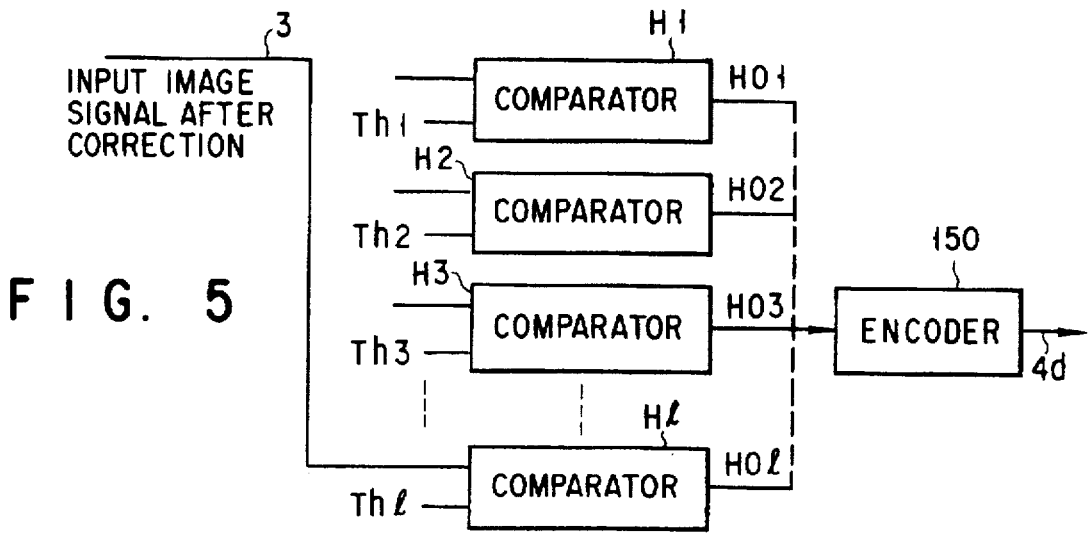
F I G. 5
F I G. 6

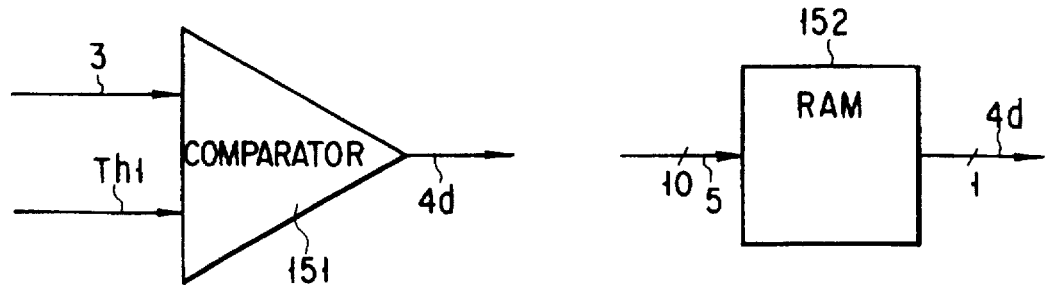
F I G. 7   F I G. 8
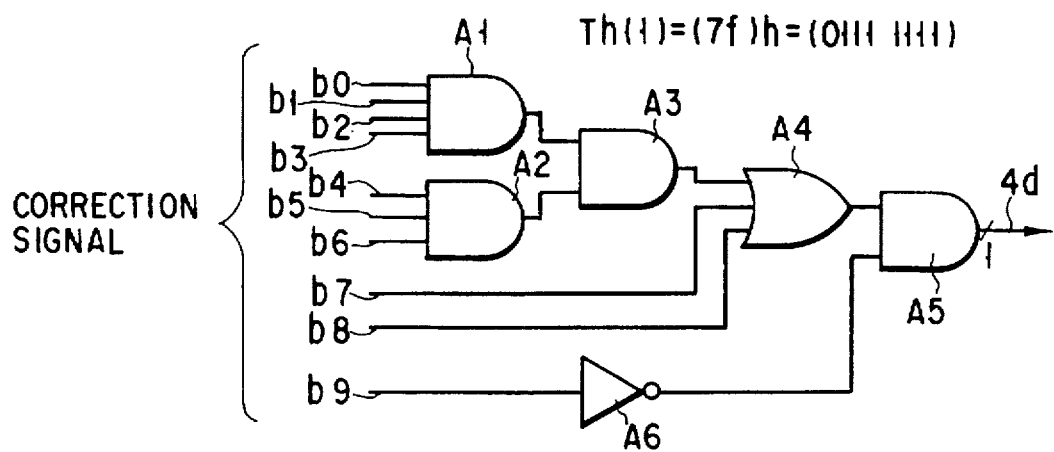
F I G. 9
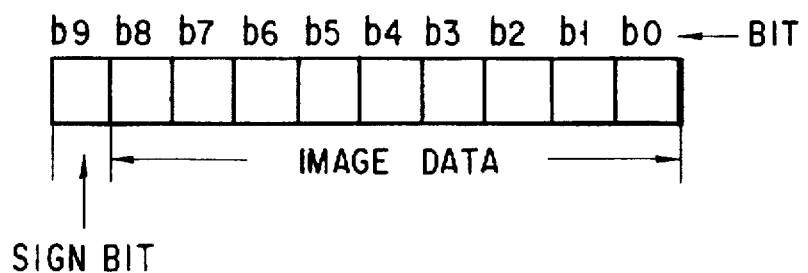
F I G. 10

COEFFICIENT  MASK

A → KA  MA

B → KB  MB

C → KC  MC

D → KD  MD

* → TARGET PIXEL

MA+MB+MC+MD = 255

KA+KB+KC+KD = 1

COEFFICIENT  MASK

A → KA  MA

B → KB  MB

* → TARGET PIXEL

MA+MB = 255

KA+KB = 1

COEFFICIENT  MASK

A → KA  MA

* → TARGET PIXEL

KA → 1

MA → 255

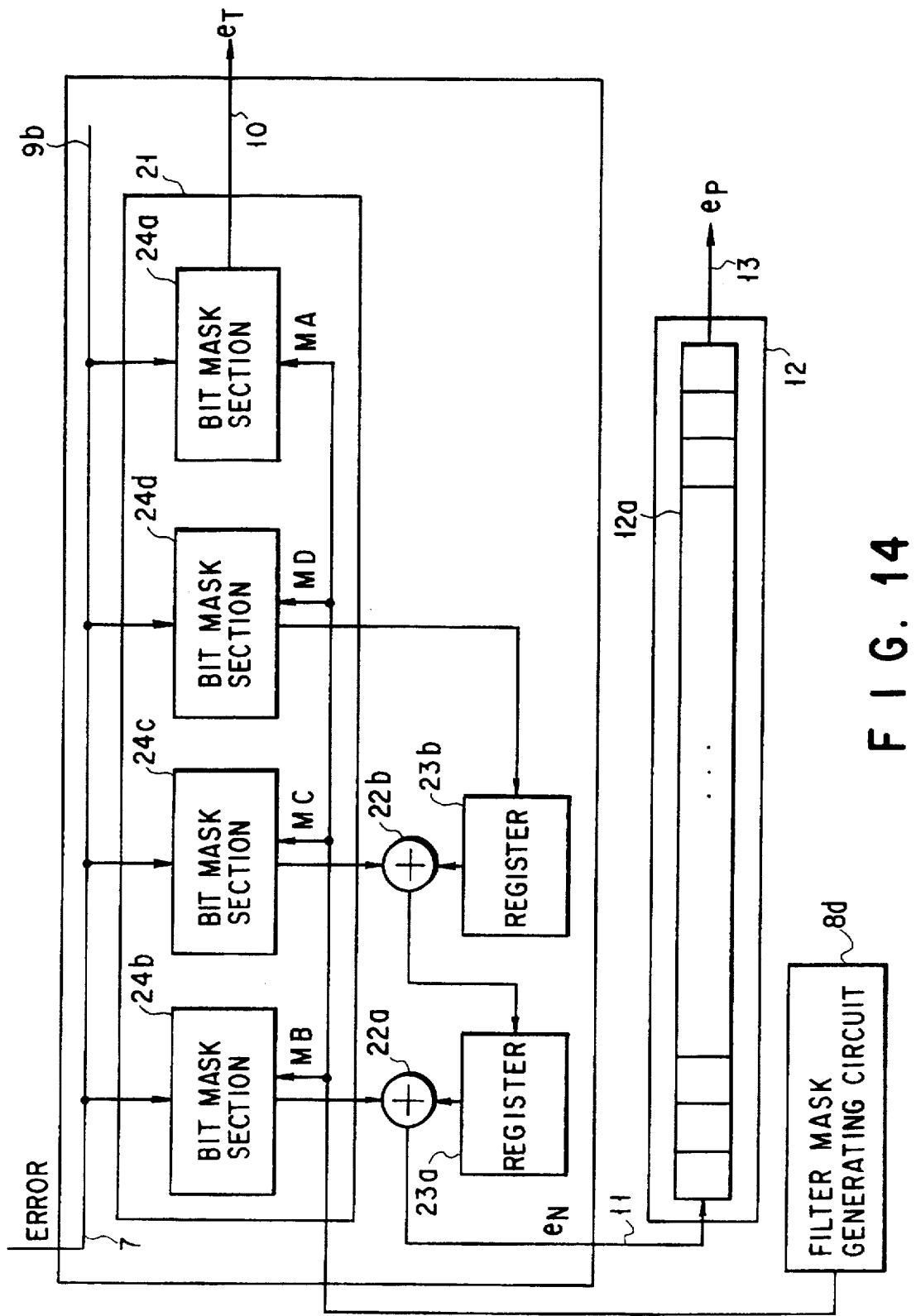
F I G. 14

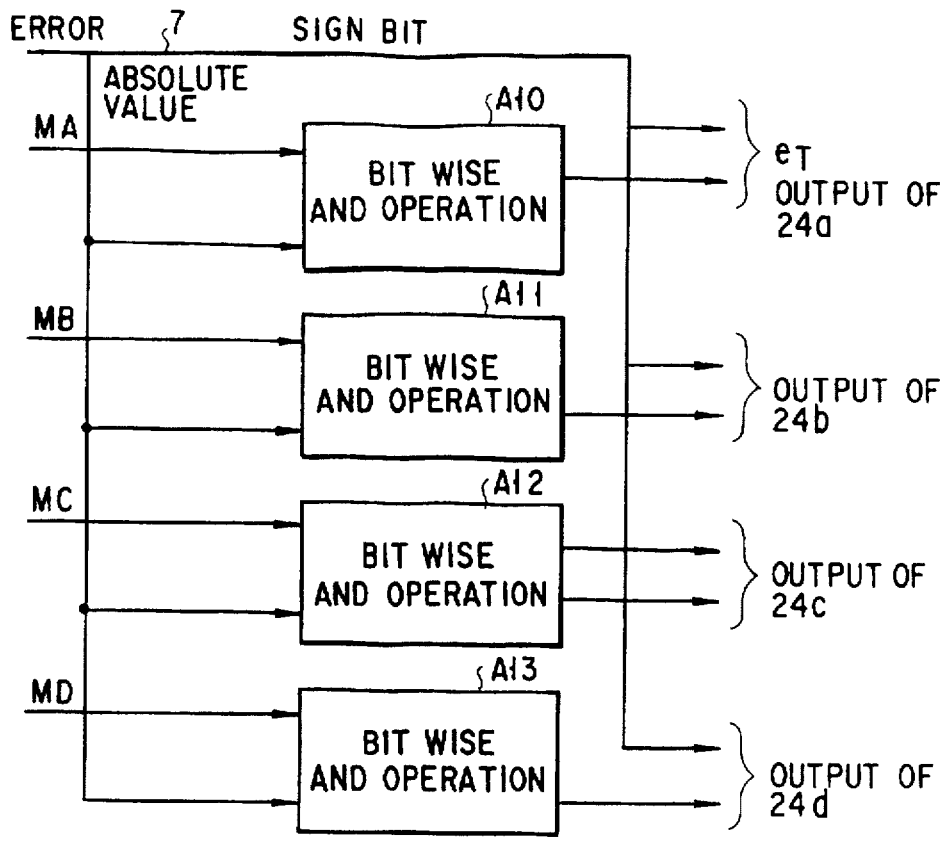
F I G. 15
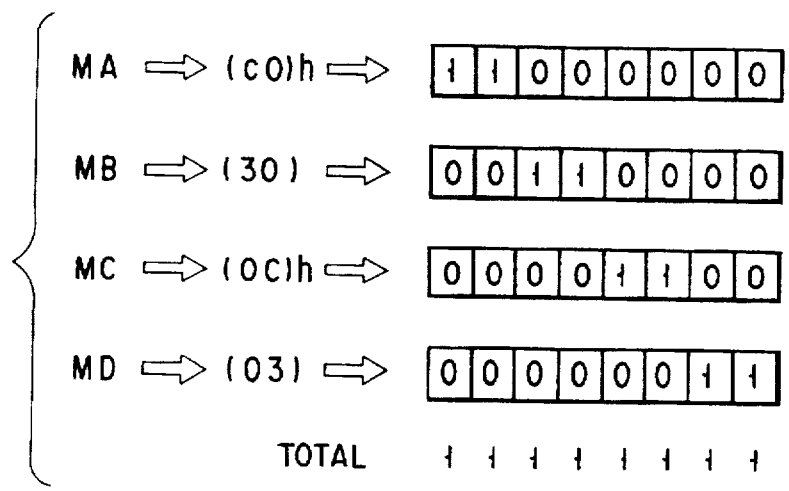
F I G. 16

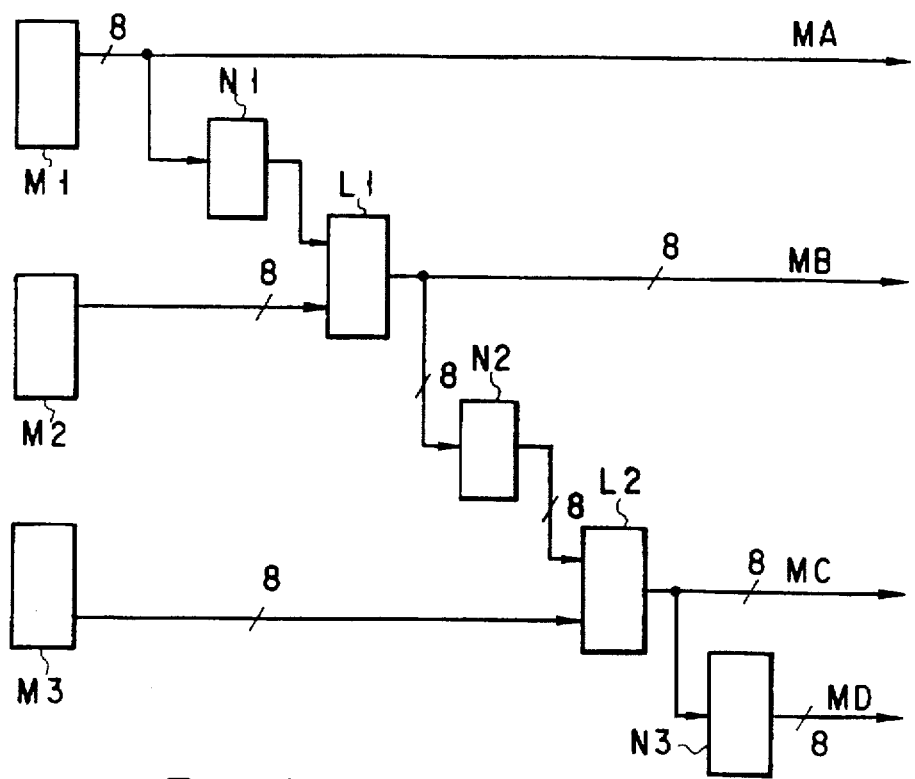
F I G. 17
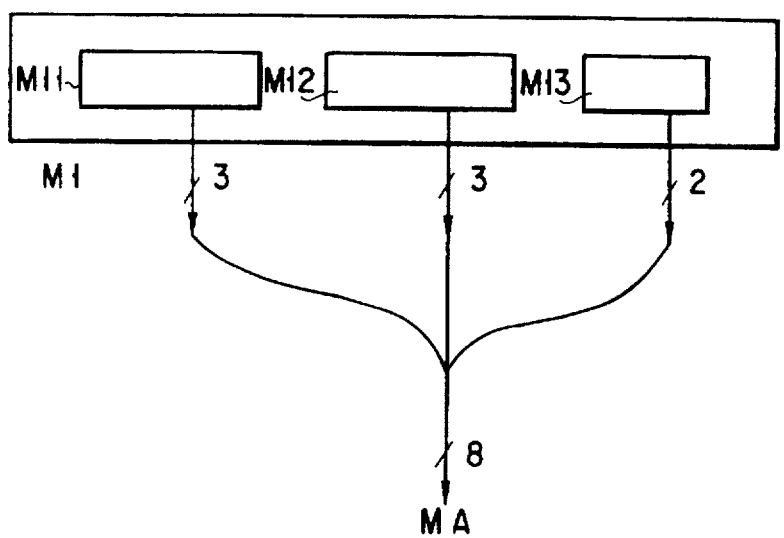
F I G. 18

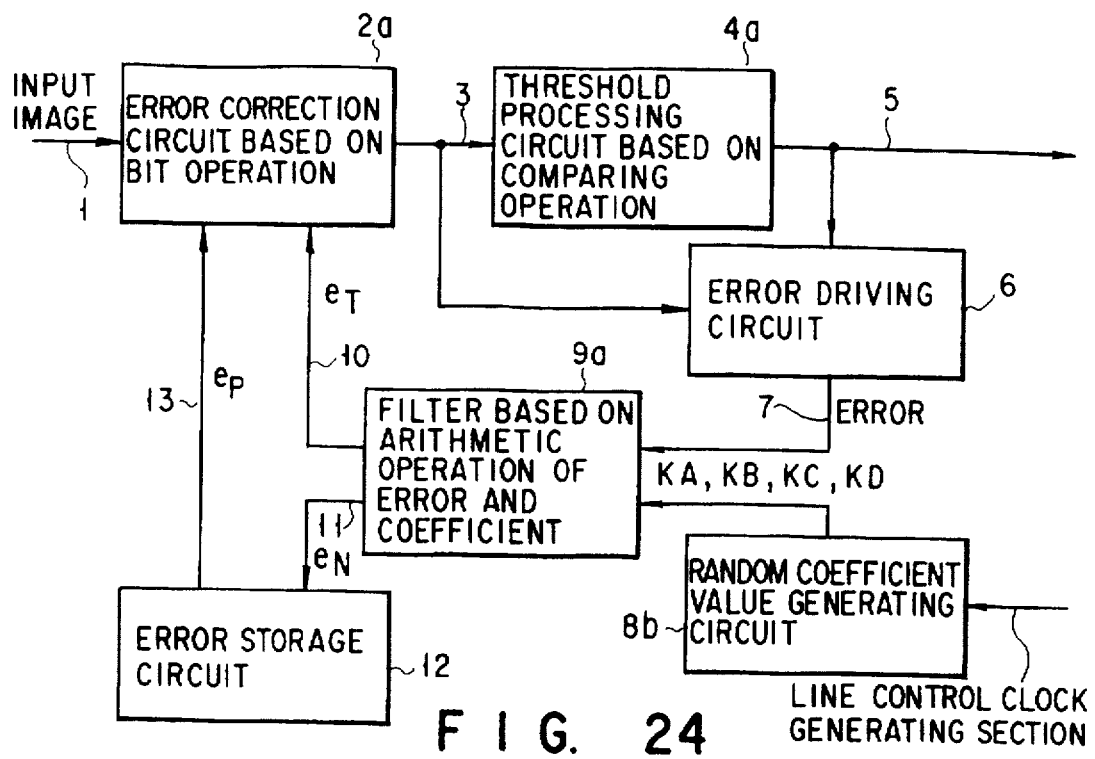
F I G. 24
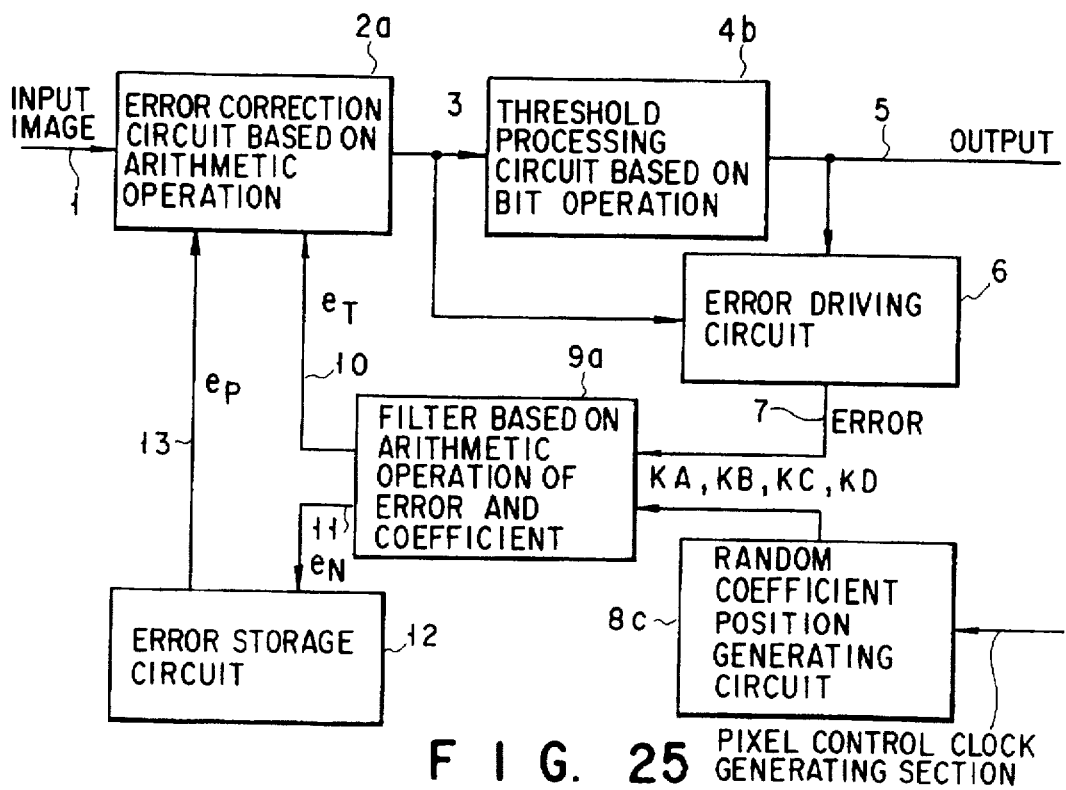
F I G. 25

IMAGE PROCESSING APPARATUS FOR PERFORMING RANDOM MASK PROCESS

BACKGROUND OF THE INVENTION

1. Field of the Invention

This invention relates to an image processing apparatus for subjecting an image of characters, diagrams or photographs, for example, to the error diffusion process to form a duplicated image

2. Description of the Related Art

Generally, in an image processing apparatus which can deal with not only code information but also image information, image information such as characters and diagrams with contrast on an original read by a reading section such as a scanner is subjected to the simple binary-coding process by use of a fixed threshold value and image information such as a photograph having gradation is subjected to the binary-coding process by a pseudo gradation circuit using the dither method, for example, and output to a binary printer having less gradation. If the read image information is subjected to the simple binary-coding process by use of the fixed threshold value, the resolution in an area of an image of characters and diagrams can be kept high and deterioration of the image quality does not occur, but since the gradation cannot be maintained in an area of photographic image, deterioration in the image quality occurs. On the other hand, if the read image information is subjected to the gradation process by the systematic dither method or the like, the gradation can be maintained in the area of photographic image and deterioration in the image quality does not occur, but since the resolution in the area of an image of characters and diagrams is lowered and deterioration of the image quality occurs. That is, if the read image information is processed by the single binary-coding process, it is impossible to simultaneously satisfy the image qualities in the areas having different characteristics.

However, an "error diffusion method" is proposed as a binary-coding/multivalue-coding system which can satisfy the gradation in an area of a photographic image and having a higher resolution in an area of a character/diagram image in comparison with the systematic dither method. The "error diffusion method" (reference document: An Adaptive Algorithm for Spatial Gray scale, by R. W. Floyd and L. Steinberg, Proceedings of the S.I.D. Vol. 17-2, pp. 75–77, Second Quarter 1976) is a method for adding a value obtained by multiplying a weight coefficient by binary errors of peripheral pixels which are already coded into a binary form to the density of a target pixel and then effecting the binary-coding process by use of a fixed threshold value.

The "error diffusion method" is to suppress the binary-coding/multivalue-coding error to minimum by diffusing an error caused by the binary-coding/multivalue-coding process for the target pixel to the peripheral pixels under a condition that the error will not leak and thus effecting the error compensation. The problem of this method is that a texture (regular pattern) appears on the output image (particularly, in the case of binary-coding process). That is, the texture is a regular stripe pattern appearing on the image plane when the conventional uniform (regular) diffusion method is effected in a case where a flat image with low density such as a background in a photograph is subjected to the diffusion process. The regular stripe pattern is called a texture, and when the image is observed, it gives an impression that the image is artificially processed.

When the filter coefficient is used, it is necessary to use a multiplier at the time of error diffusion filtering, thereby causing a problem that the circuit scale becomes large and the operation speed is lowered. In order to solve the above problem, a method of setting the filter coefficient to the n-th power of 2 is proposed, but in this case, the texture in the output image becomes more significant. As a method of reducing the texture, a method of randomly setting the position of the filter coefficient is provided, but the probability that the coefficient appears on the respective positions is low and the g is relatively low. A method of randomly setting the coefficient value may be considered, but in this case, it is necessary to set the random coefficient (A+B+C+D) to 1 and it is extremely complicated.

And, one of error diffusion method is showed in "Digital Halftoning" by Robert Ulichnery in 1987. In chapter 8-3, the author describes ways to reduce visual artifacts that appear due to deterministic nature of basic error diffusion. The author suggests that random noise can be added to the elements or weight of the error filter. A method of tandemly positioning a single weight filter is described in 8-3-1. However, the apparatus structure which realizes this method is not shown in the reference.

A method using only the mask and logical products instead of the coefficient is proposed, and the method is a high-speed method for reducing the texture by the synergistic effect of variation noise of the scanner or the like. However, for images such as CG (computer graphics), the degree of randomization is low and the texture cannot be sufficiently reduced.

As described above, when the filter coefficient is used in the image processing apparatus for effecting the error diffusion process, the multiplier is necessary to cause a problem that the circuit scale becomes large and the operation speed is lowered. Further, a method of setting the filter coefficient to the n-th power of 2 is provided, but in this case, the texture becomes more significant in the output image. A problem that the degree of randomization is lowered when the position is randomly set to reduce the texture and generation of the coefficient becomes complicated when the coefficient value is randomly set. Further, a high-speed filtering method using a mask instead of the coefficient and using a logical product of the binary-coded error and mask value is provided, but a sufficient effect of texture reduction for numerically created images such as CG cannot be obtained. In the case of high-speed processing, since the error correction by the adding process or the threshold process by use of a comparator takes a long time, diffusion to the adjacent pixel cannot be effected in time and it is required to simplify the threshold process and correction process and enhance the operation speed thereof.

SUMMARY OF THE INVENTION

An object of this invention is to provide an image processing apparatus capable of reducing the texture, simplifying the error diffusion process and enhancing the operation speed thereof.

An image processing apparatus of this invention comprises means for correcting a first image data of a target pixel according to a correction amount and outputting a second image data; means for generating a first image data on the basis of the second image data and a preset threshold value, the third image data having a gradation value less than one of the second image data; means for comparing the second image data with the third image data to output a difference value therebetween; and means for deriving the correction amount based on the difference value to randomly diffuse the difference value to the peripheral portion of the target pixel so as to supply the correction amount to the correcting means.

In this invention, with the above construction, when the diffusion process is performed for the light and shade in a low density area such as the background of a photographic image area, the texture caused by performing the conventional simple diffusion process can be reduced by effecting the random diffusion process. That is, if the regular diffusion process is performed by a simple and standardized processing method, a diffused error causes a stripe-form artificial image. On the other hand, in this invention, for example, the mask process is performed based on coefficients randomly generated for mask values or mask positions when image information is subjected to the mask process. By this process, an image processing apparatus can be realized by this invention, and in the image processing apparatus, since the error (that is, the fine light and shade pattern on the background in a photographic area) can be diffused in a randomly distributed form which normally exists in the natural world, the background area of a photographic image created by a printer, for example, produces natural impression.

BRIEF DESCRIPTION OF THE DRAWINGS

FIG. 2A is a diagram showing a first concrete example of the construction of an error correction circuit based on the arithmetic operation of FIG. 1;

FIG. 2B is a diagram showing a second concrete example of the construction of the error correction circuit based on the arithmetic operation of FIG. 1;

FIG. 3A is a diagram showing a first concrete example of the construction of an error correction circuit based on the bit operation of FIG. 1;

FIG. 3B is a diagram showing a second concrete example of the construction of the error correction circuit based on the bit operation of FIG. 1;

FIG. 4A is a diagram showing a concrete example of the construction of an AND circuit for bit operation in the main portion for performing the logical operation for each bit in the concrete example of the construction of FIG. 3A;

FIG. 4B is a diagram showing a concrete example of the construction of an OR circuit for bit operation in the main portion for performing the logical operation for each bit in the concrete example of the construction of FIG. 3A;

FIG. 5 is a diagram showing a concrete example of the construction of a threshold processing circuit based on the comparing operation in FIG. 1, for deriving multivalue-coded data;

FIG. 6 is a diagram showing an example of an output of an encoder of FIG. 5;

FIG. 7 is a diagram showing another concrete example of the construction of the threshold processing circuit based on the comparing operation in FIG. 1, for performing the binary-coding threshold processing using a comparator;

FIG. 8 is a diagram showing still another concrete example of the construction of the threshold processing circuit based on the comparing operation in FIG. 1, for performing the binary-coding threshold processing using a RAM;

FIG. 9 is a diagram showing another concrete example of the construction of the threshold processing circuit based on the comparing operation in FIG. 1, for effecting the binary-coding threshold processing using a fixed threshold value;

FIG. 10 is a diagram showing an example of the bit expansion of a correction signal output from the error correction circuit of FIG. 1;

FIG. 14 is a diagram showing a concrete example of the construction of a filter based on the bit operation for error and mask in FIG. 1;

FIG. 15 is a diagram showing a concrete example of the construction of the main portion for performing the bit operation in the filter shown in FIG. 14;

FIG. 16 is a diagram showing a concrete example of a bit mask;

FIG. 17 is a diagram schematically showing the construction of a random mask value generating circuit of FIG. 1;

FIG. 18 is a diagram schematically showing the construction of the main portion of the random mask value generating circuit of FIG. 1;

FIG. 24 is a diagram schematically showing the construction of an image processing apparatus according to a fourth embodiment of this invention; and FIG. 25 is a diagram schematically showing the construction of an image processing apparatus according to a fifth embodiment of this invention.

DETAILED DESCRIPTION OF THE PREFERRED EMBODIMENTS

There will now be described embodiments of this invention with reference to the accompanying drawings.

This invention is explained to mainly derive binary data as an output image, but is not limited to this case and can be applied to a case wherein multivalue-coded data is derived as an output image.

Figure 1:
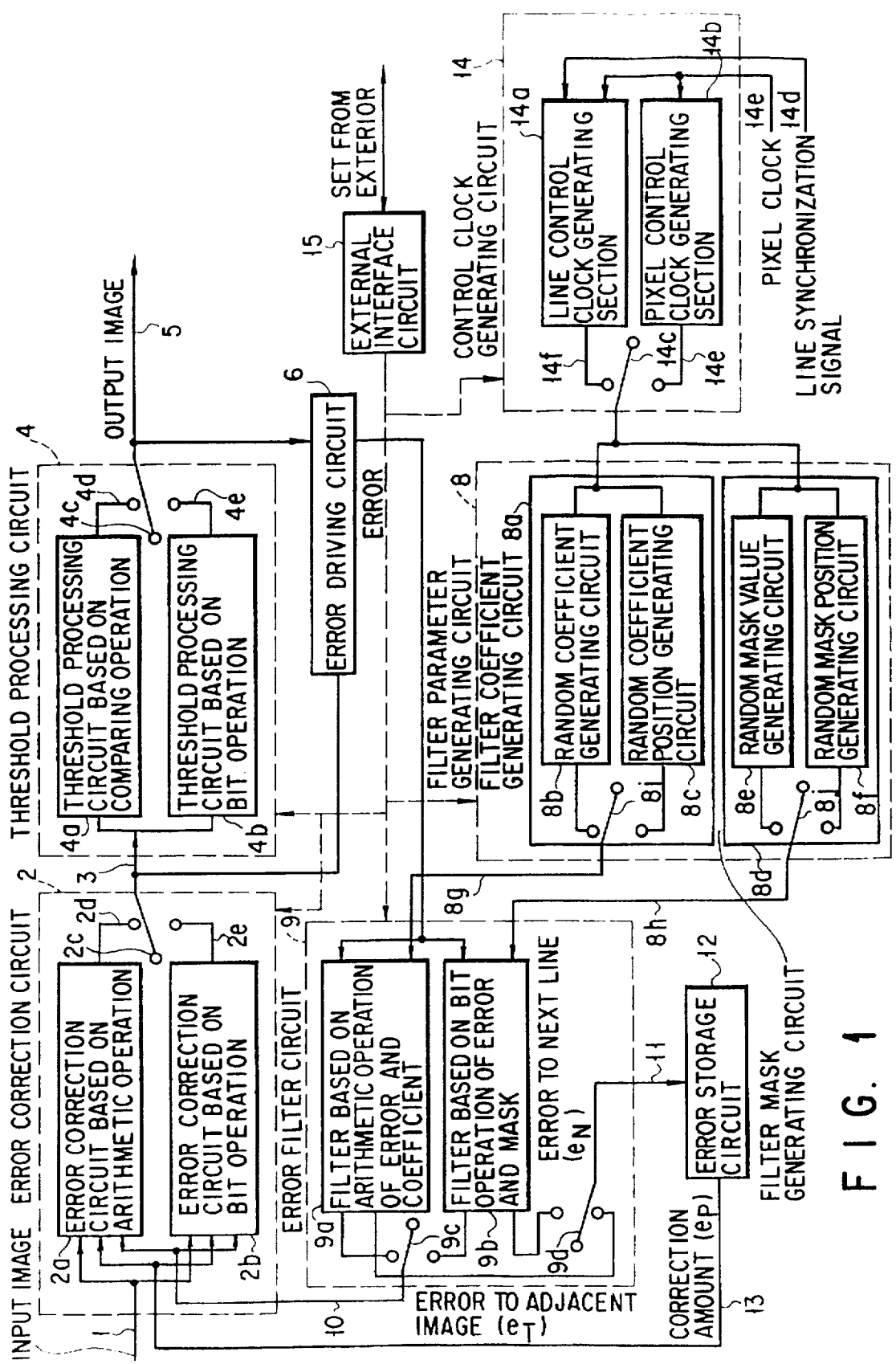
FIG. 1 is a diagram schematically showing the construction of an image processing apparatus according to a first embodiment of this invention.

FIG. 1 schematically shows the construction of an image processing apparatus according to a first embodiment of this invention. The first embodiment is constructed such that four points of use of a random mask for diffusing the error ($8d$), error correction by the bit operation ($2e$), threshold processing by the bit operation ($4b$) and control clock for each line ($14a$) can be selectively set and the circuit construction of FIG. 1 is made to simultaneously represent the important points of this invention.

In FIG. 1, for example, if an image (input image) is read by a scanner and input pixel data 1 for each pixel which is density data of a plurality of bits (for example, 8 bits) for the input image is input to the image processing apparatus, the input pixel data is first input to an error correction circuit 2. Then, in the error correction circuit 2, the input pixel data 1 for each pixel is corrected by use of a correction amount 10 (which is hereinafter simply referred to as a correction amount eT) for an adjacent pixel output from an error filter circuit 9 which will be described later and an error correction amount 13 (which is hereinafter simply referred to as a correction amount eP) diffused from the preceding line. Then, a correction signal 3 corrected by the error correction circuit 2 is supplied to a threshold processing circuit 4 and error deriving circuit 6.

The error correction circuit 2 can select one of a correction circuit 2a based on the arithmetic operation and an error correction circuit 2b based on the bit operation, and the selecting operation is effected by controlling a switch 2c.

The threshold processing circuit 4 converts the correction signal 3 of the target pixel into binary-coded data of one bit or multivalue-coded data of two or more bits and outputs the coded data as output pixel data 5. The pixel data 5 output from the threshold processing circuit 4 is supplied to an output device such as an external printer or display device and processed to form a duplicate image of the input image and the data is also supplied to the correction deriving circuit 6.

The threshold processing circuit 4 can select one of a threshold processing circuit 4a based on the comparing operation and a threshold processing circuit 4b based on the bit operation for simplifying the process and enhancing the processing speed and the circuit function can be selectively set by use of a switch 4c.

The correction deriving circuit 6 derives an error of binary-coded data or multivalue-coded data subjected to the threshold process for the target pixel from the correction signal 3 and output pixel data 5 and an error signal 7 derived in the error deriving circuit 6 is supplied to an error filter circuit 9.

The error filter circuit 9 is supplied with the error signal 7 from the correction deriving circuit 6 and a filter parameter output from a filter parameter generating circuit 8 and outputs an error correction amount 11 (which is hereinafter simply referred to as a correction amount eN) for the next line and a correction amount eT to be diffused to the neighboring pixel on the same line based on the set filter construction.

The error filter circuit 9 can select one of a filter 9a based on the arithmetic operation and a filter 9b based on the bit operation and the filter selection can be made by use of switches 9c, 9d.

The filter 9a based on the arithmetic operation deals with the filter parameter as a filter coefficient and performs the error filtering process based on the arithmetic operation (multiplication) of the error signal 7 and the filter coefficient.

The filter 9b based on the bit operation deals with the filter parameter as a filter mask and performs the error filtering process based on the bit operation (logical product for each bit) of the error signal 7 and the filter mask.

The filter parameter generating circuit 8 includes a filter coefficient generating circuit 8a and a filter mask generating circuit 8d, the filter 9a based on the arithmetic operation is supplied with a filter coefficient 8g generated from the filter coefficient generating circuit 8a, and the filter 9b based on the bit operation is supplied with a filter coefficient 8h generated from the filter mask generating circuit 8d. In this example, the filter coefficient 8g and filter mask 8h are generally referred to as a filter parameter.

The filter coefficient generating circuit 8a can select one of a random coefficient generating circuit 8b and random coefficient position generating circuit 8c and the selecting operation is effected by use of a switch 8i.

The random coefficient generating circuit 8b is a circuit for randomly generating coefficient values to diffuse the multivalue-coded error to the peripheral pixels under the condition that the error will not leak.

The random coefficient position generating circuit 8c is a circuit for randomly setting preset coefficients to correspond to the peripheral pixels so as to diffuse the multivalue-coded error to the peripheral pixels under the condition that the error will not leak. In a special case, a process using a constant coefficient for all of the pixels can be performed, and in this case, the same error diffusion as the conventional error diffusion is effected.

In the filter mask generating circuit 8d, one of a random mask value generating circuit 8e and random mask position generating circuit 8f can be selectively operated and the selecting operation is performed by use of a switch 8j.

The random mask value generating circuit 8e is a circuit for randomly generating mask values to diffuse the multivalue error to the peripheral pixels under the condition that the error will not leak.

The random mask position generating circuit 8f is a circuit for randomly setting preset mask values to correspond to the peripheral pixels so as to diffuse the multivalue error to the peripheral pixels under the condition that the error will not leak. In a special case, a process using a constant mask for all of the pixels can be effected.

An error storage circuit 12 is a storage circuit for storing a correction amount eN to be diffused to the next line supplied from the error filter circuit 9 and it supplies a correction amount eP from the preceding line corresponding to the target pixel to be processed to the error correction circuit 2.

A control clock generating circuit 14 generates a clock used for filter parameter generation processing and, for example, it receives a pixel clock 14e and line synchronization signal 14f obtained when the image of an original is read by the scanner and supplies a control clock signal to the filter parameter generation circuit 8. Randomization for each line and randomization for each pixel of the filter parameter become possible by use of the control clock signal.

A control clock signal 14d output from the line control clock generating section 14a based on the line synchronization signal 14f makes it possible to effect the randomization for each line by effecting the random number generation in the filter parameter generating circuit 8 for each line (that is, pixel row of one scanning operation of an image read).

The pixel control clock generating section 14b makes it possible to perform the randomization of the parameter for each pixel by shifting the random number generation in the filter parameter generating circuit 8 for each pixel by use of the pixel clock 14e.

One of the line control clock generating section 14a and the pixel control clock generating section 14b can be selected by a switch 14c.

An external interface circuit 15 is an external input/output interface which permits the user to set the best combination of the above circuits from the exterior by considering the image quality, processing speed, cost and the like.

Next, the above circuits are explained in detail.

First, the error correction circuit 2a based on the arithmetic operation in the error correcting section 2 is explained with reference to FIG. 2A.

FIG. 2A shows a concrete example of the construction of the error correcting circuit 2a based on the arithmetic operation. In an adder 100, a correction amount eT diffused from an adjacent pixel is added to input pixel data 1, the result of addition (input pixel data corrected by a multivalue-coded error of the adjacent pixel) is input to a flip-flop circuit 101, and then it is output from the flip-flop circuit to the next-stage adder 102 with a delay of one clock in synchronism with a pixel clock 14e.

The adder 102 is further supplied with a correction amount eP diffused from the preceding line, and the two inputs to the adder are added together and the result of addition is output as corrected input pixel data 2d.

With the construction of the error correction circuit 2a based on the arithmetic operation as shown in FIG. 2A, the operation is performed on the condition that a method of representing a negative value by the complement on two (complement representation) is used, but in the case of Signed Magnitude representation (absolute representation using a combination of a sign and an absolute value), the construction is made as shown in FIG. 2B.

In FIG. 2B, input pixel data 1 (8-bit positive value) is added to the absolute value of a correction amount eT from an adjacent pixel in an adder 103 and they are subjected to the subtraction in a subtracter 104, and the result of addition and the result of subtraction are input to a selector 105.

When the sign bit of the correction amount eT from the adjacent pixel is positive (0), the result of addition from the adder 103 is output from the selector 105, and when the sign bit is negative (1), the result of subtraction from the subtracter 104 is output from the selector 105.

An output of the selector 105 is input to a flip-flop circuit 106 and then output to the next stage as correction pixel data obtained by the multivalue coding of the adjacent pixel in synchronism with the pixel clock 14e.

In a correction circuit 107, correction pixel data from the flip-flop circuit 106 is corrected by use of a correction amount eP from the preceding line. First, the correction pixel data from the flip-flop circuit 106 and the correction amount eP from the preceding line are added together in an adder 108 and they are subjected to the subtraction in subtracters 109, 110, the result of addition in the adder 108 is output to a first input terminal (an input terminal indicated by "00") and a fourth input terminal (an input terminal indicated by "11") of a selector 111, and the results of subtraction in the subtracters 109, 110 are respectively output to a second input terminal (an input terminal indicated by "01") and a third input terminal (an input terminal indicated by "10") of the selector 111.

In the selector 111, one of the data items input to the first to fourth input terminals is selected by the sign bits of the output of the flip-flop circuit 106 and the correction amount eP and output as corrected input pixel data 2d. That is, if both of the sign bits of the two inputs are the same, the result of addition in the adder 108 is output, if the sign bit of the correction amount eP is negative, the result of subtraction in the subtracter 109 is output, and if the sign bit of the output of the flip-flop circuit 106 is negative, the result of subtraction in the subtracter 110 is output. Thus, the same results as those in the case of FIG. 2A can also be obtained in the case of representation of the sign and absolute value.

Next, the error correction circuit 2b based on the bit operation in the error correction section 2 of FIG. 1 is explained with reference to FIGS. 3A, 3B.

FIG. 3A shows a concrete example of the construction of the error correction circuit 2b based on the bit operation in a case where image data and correction amount eT are represented by the complement on two. The error correction circuit 2b based on the bit operation is obtained by replacing part of the error correction circuit 2a based on the arithmetic operation by a circuit portion based on the bit operation.

In FIG. 3A, first, input pixel data 1, a correction amount eT diffused from the preceding pixel and a correction amount 128 which is not corrected by the bit operation in the correction amount eP from the preceding line are added in an adder 120, and the result of addition is input to a flip-flop circuit 121.

The flip-flop circuit 121 outputs the result of addition in the adder 120 to the next stage in synchronism with the pixel clock 14e.

The correction amount eP from the preceding line is input to a selector 123 which outputs the correction amount eP from the preceding line when an output signal of an OR circuit 122 which is a select signal is "0" and outputs "0" at the other time.

The select signal is output from the OR circuit 122, set to "0" only when the output of the flip-flop circuit 121 and the correction amount eP from the preceding line are positive and set to "1" at the other time. Therefore, the selector 123 outputs the correction amount eP from the preceding line only when the correction amount eP from the preceding line and the output of the flip-flop circuit 121 are both positive and outputs "0" at the other time.

In an OR circuit 124 for bit operation, the logical sum of the output of the flip-flop circuit 121 and the output of the selector 123 is derived for each bit and corrected and the result is supplied to one input terminal of a selector 127.

The output of the flip-flop circuit 121 is also input to an adder 125 and added to the correction amount eP from the preceding line and corrected, and then the result of addition is supplied to the other input terminal of the selector 127 as a correction output based on the arithmetic operation.

The selector 127 outputs the result of correction based on the bit operation as corrected input pixel data 2e only when the select signal output from the selector 123 is "0", that is, when the output of the flip-flop circuit 121 and the correction amount eP from the preceding line are both positive and outputs an output of the adder 125 which is the result of correction based on the arithmetic operation as corrected input pixel data 2e at the other time.

An AND circuit 126 for bit operation derives the logical product of the output of the flip-flop circuit 121 and the output of the selector 123 for each bit, outputs a correction amount 128 which is not corrected by the bit operation and supplies the correction amount to the adder 120 as a correction amount for the next pixel.

When the select signal (output signal of the OR circuit 122) of the selector 123 is "1", that is, when at least one of the correction amount eP from the preceding line and the output of the flip-flop circuit 121 is negative, the correction amount 128 becomes "0" (in this case, pixel data 2e is corrected by the arithmetic operation).

In FIG. 3A, as the corrected pixel data 2e, one of the pixel data corrected by the bit operation which is an output from the OR circuit 124 and the pixel data corrected by the arithmetic operation which is an output from the adder 125 is selected and output according to a preset condition, but as will be described with reference to FIG. 3B, it is possible to output corrected pixel data 2e as data corrected by the bit operation, effect the correction only when the output of the flip-flop circuit 121 and the correction amount eP from the preceding line are both positive, and output the correction amount eP from the preceding line as the correction amount 128 for the next pixel via the selector 136 as shown in FIG. 3B at the other time.

Next, another concrete example of the construction of the error correction circuit 2b based on the bit operation in a case where input pixel data 1 and correction amounts eT, eP are represented by absolute values is explained with reference to FIG. 3B.

The construction shown in FIG. 3B is substantially the same as that shown in FIG. 3A, but an adder 120 used in this example is not a simple adder and corresponds to the correction circuit 107 shown in FIG. 2B.

Since the corrected pixel data 2e is corrected by the bit operation and the output of the selector 123 becomes "0" when the select signal is "1", the corrected pixel data 2e output from the OR circuit 124 for bit operation is the same as that output from the flip-flop circuit 121.

The output of the selector 123 acts as a correction amount eP of the preceding line when the select signal is "0", and the corrected pixel data output from the OR circuit 124 for bit operation is output as pixel data which is obtained by correcting the input pixel data 1 by adding the same to the correction amount eT from the preceding line and further correcting the thus corrected pixel data by use of the correction amount eP from the preceding line.

In FIG. 3B, when the select signal is "1", correction by the correction amount eP from the preceding line is not performed, and therefore, it is supplied via the selector 136 and used as a correction amount 128 for the next pixel.

The select signal is output from an exclusive-OR (EXOR) circuit 132 and becomes "0" when the sign bits of the correction amount eP from the preceding line and an output of the flip-flop circuit 121 input to the exclusive-OR (EXOR) circuit 132 are both "1" or "0", and it becomes "1" at the other time. Therefore, only when the output of the flip-flop circuit 121 and the correction amount eP from the preceding line are both negative or positive, correction by the bit operation is performed, and at the other time, the correction amount eP is supplied as the correction amount 128 for the next pixel via the selector 136.

With the construction of FIG. 3B, the select signal is created by the exclusive-OR (EXOR) circuit 132, but the select signal may be created by the logical sum as shown in FIG. 3A. In this case, it becomes effective only when the output of the flip-flop circuit 121 and the correction amount eP from the preceding line are both positive. Further, as the correction circuit for the input pixel data 1, not only a circuit based on the bit operation but also a circuit with the construction shown in FIG. 3A in which one of the bit operation and the arithmetic operation is selectively set by the select signal may be used.

Next, concrete examples of the AND circuit 126 for bit operation and the OR circuit 124 for bit operation in the bit operation error correction circuits (FIGS. 3A and 3B) are explained with reference to FIGS. 4A and 4B.

The number of bits of the output of the flip-flop circuit 121 and the number of bits of the output of the selector 123 in FIGS. 3A and 3B are set to the same value, for example, 10 bits (including a sign bit).

If the output of the flip-flop circuit 121 is expressed by Hb0, Hb1, Hb2, - - -, Hb9 and the output of the selector 123 is expressed by Sb0, Sb1, Sb2, - - -, Sb9, the AND circuit 126 for bit operation is constructed to include AND circuits 140a to 140j to which the above outputs are supplied and which derive the logical products of the two received outputs for each bit and output a 10-bit correction amount as shown in FIG. 4A. Likewise, the OR circuit 124 for bit operation has OR circuits 141a to 141j to which the 10-bit output from the flip-flop circuit 121 and the 10-bit output of the selector 123 are supplied and which derive the logical sums of the two received outputs for each bit and output a 10-bit corrected pixel data as shown in FIG. 4B.

In the case of correction by the arithmetic operation (multiplication), all of the correction amount eP diffused from the preceding line is used for correction of the target pixel, but in the case of correction by the bit operation, only part of the correction amount eP from the preceding line is used for correction of the target pixel based on the signs of the input pixel value, error (correction amount) and the like and the remaining part thereof is used for correction of a next pixel to be processed. Therefore, the position and amount of diffusion errors from the peripheral pixels can be dynamically changed and the texture can be reduced in comparison with a method for diffusing the error to the peripheral pixels by use of a constant coefficient.

Next, the threshold processing circuit 4a based on th e comparing operation of the threshold processing circuit 4 is explained with reference to FIGS. 5 to 10.

FIG. 5 shows a concrete example of the threshold processing circuit 4a based on the comparing operation, and particularly, the number of output levels (for example, if the bit number of the multivalue-coded data is 4, the number of output levels is 16) corresponding to a desired bit number may be set as multivalue-coded data in order to obtain multivalue-coded data as the output pixel data 5. In order to obtain binary-coded data as the output pixel data 5, the number of output levels may be set to 1.

In FIG. 5, a case wherein the number of output levels is set to (1+1) is explained.

Comparators H1, H2, - - -, Hl are provided for respective output levels 0, 1, - - -, l, and the correction signal 3 from the error correction circuit 2 is supplied to the comparators and compared with threshold values Th1 to Thl determined according to the output levels of the respective comparators H1, H2, - - -, Hl, and the results of comparison H01, H02, - - -, H0l are output.

In each of the comparators H1, H2, - - -, Hl (Hi, i=0 to 1), the correction signal 3 is compared with the threshold value set in a corresponding one of the comparators, and when the correction signal 3 is smaller than the threshold value th1, "0" is output as the result of comparison H0l and "1" is output as H0l at the other time.

An encoder 150 is used to encode the result of comparison H0l and outputs multivalue-coded data 4d of one type corresponding to the result of comparison. A concrete example of the relation between the results of HOi and multivalue-coded data items 4d output from the encoder 150 is shown in FIG. 6.

Since only two levels of "0" and "1" are present when binary-coded data is obtained as the output pixel data 5, the construction can be made as shown in FIG. 7.

In FIG. 7, a comparator 151 compares the threshold value Th1 with the correction signal 3, outputs "0" when the correction signal 3 is smaller than the threshold value Th1, and outputs "1" at the other time.

Various constructions other than the above constructions can be considered as the threshold processing circuit 4.

Another concrete example of the threshold processing circuit for obtaining binary-coded data as shown in FIG. 7, for example, is explained with reference to FIG. 8.

In FIG. 8, binary-coded data items corresponding to all of the possible correction signals 3 are previously written into a RAM 152 of 1 bit×1 Kbyte, for example, and the binary-coding process can be performed by using the correction signal 3 as an address signal of the RAM 152. Converting information written into the RAM 152 may be obtained by causing a CPU (not shown) to read out conversion data (not shown) from a ROM having the conversion data stored therein and write the readout data into the RAM 152, for example. Further, a ROM can be used instead of the RAM 152.

In the threshold processing circuit for deriving binary-coded data as shown in FIG. 7 or 8, it is possible to set the threshold value Th1 from the exterior.

In the case where the threshold value Th1 is fixed, the construction can be made as shown in FIG. 9.

FIG. 9 shows a threshold processing circuit using logic circuits to compare the correction signal with the threshold value Th1=7F (which is represented in the hexadecimal notation and is denoted by 7Fh), and the logical condition is determined such that pixel data 4d will become "0" when the correction signal 3 is smaller than 7Fh and the pixel data will become "1" at the other time.

For example, since it is supposed that the correction signal 3 is constructed by one sign bit (b9) and nine bits of the absolute value (b0 to b8) and the bit expansion of the threshold value Th1=7Fn is "01111111" as shown in FIG. 10, an output of an AND gate A3 becomes "1" when all of the lower seven bits (b0 to b6) of the correction signal 3 are "1" by use of the AND circuits A1 to A3 and it becomes "0" in the other case. Further, an OR circuit A4 is supplied with an output of the AND circuit A3, the eighth bit (b7) of the correction signal 3, and the ninth bit (b8) of the correction signal 3. When the correction signal 3 is equal to the threshold value Th1, only the output of the AND gate A3 becomes "1", and when the correction signal 3 is larger than Th1, one of the other two inputs to the OR circuit A4 becomes "1". The sign bit of the correction signal 3 and an output of the OR circuit A4 are input to an AND circuit A5, and when the correction signal 3 is negative, an output of the AND circuit A4 is forcedly set to "0". Therefore, an output of the AND gate A5 becomes "1" when the correction signal 3 is equal to or larger than 7Fh, and it becomes "0" in the other case.

In this example, a case wherein the threshold value Th1 is set at 7Fh is explained, but the comparing circuit can be constructed in the same manner as described above in a case wherein the threshold value Th1 is set to a value other than 7Fh.

Thus, the circuit scale of the threshold operation circuit by the logic circuit can be made small and the threshold operation can be performed at high speed, but the threshold value is fixed and cannot be set from the exterior.

Next, a concrete example of the threshold processing circuit 4b based on the bit operation of FIG. 1 is explained with reference to FIG. 11. The threshold processing circuit 4b based on the bit operation shown in FIG. 11 effects the threshold processing by the simple bit operation unlike the comparing operation shown in FIGS. 5 and 7. Therefore, the threshold processing can be performed at high speed. In this example, a case wherein binary-coded data is obtained as output pixel data 5 is explained.

Figure 11:
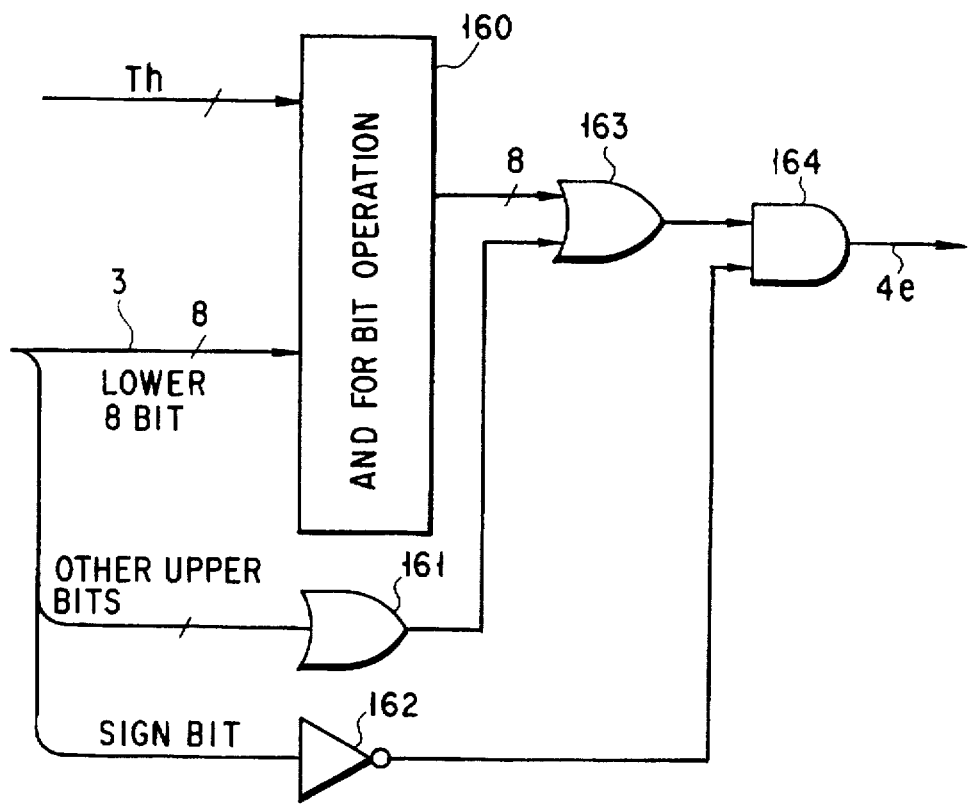
FIG. 11 is a diagram showing a concrete example of the construction of a threshold processing circuit based on the bit operation of FIG. 1.

In FIG. 11, the threshold value Th is a value which is set from the exterior or a value generated by use of a pseudo random series which will be described later.

The threshold processing circuit 4b based on the bit operation shown in FIG. 11 mainly includes an AND circuit 160 for bit operation for deriving the logical product of the lower eight bits (b0 to b7 in FIG. 10) of the correction signal 3 and the threshold value Th for each bit, an OR circuit 161 for deriving the logical sum of the other upper bits of the correction signal 3, an OR circuit 163 for deriving the logical sum of each bit of an output of the AND circuit 160 and an output bit of the OR circuit 161, and an AND gate 164 for controlling an output according to the sign bit of the correction signal 3.

If the correction signal 3 is negative, pixel data 2e which is binary-coded data output from the AND circuit 163 becomes "0", and when the correction signal 3 is equal to or larger than 255 ((28-1) when T is an 8-bit value), an output of the OR circuit 163 becomes "1" due to an output of the OR circuit 161, and therefore, pixel data 4e output from the AND circuit 163 becomes "1".

That is, the threshold processing circuit with the construction shown in FIG. 11 derives the logical product of the threshold value Th and the lower eight bits of the correction signal 3 for each bit, and outputs binary-coded data 4e of "1" if at least one bit of the logical product obtained as the result of logical operation and outputs binary-coded data 4e of "0" in the other case.

The AND circuit 160 for bit operation is similar to that shown in FIG. 4A, but the bit number thereof is different in this example (the bit number is 8).

Thus, according to the threshold processing circuit 4b based on the bit operation shown in FIG. 11, since the same effect as in the case of threshold randomization can be obtained in determination of "0" or "1" for binary-coded data 4e used as output pixel data 5, the texture of the output image can be reduced. Further, since the construction is made to perform simple logical operations, the processing operation can be simplified and the processing speed can be enhanced. If the threshold value itself is determined by the pseudo random series as described above, the degree of randomization is enhanced and the texture can be further reduced.

Next, the error deriving circuit 6 of FIG. 1 is explained with reference to FIG. 12.

Figure 12:
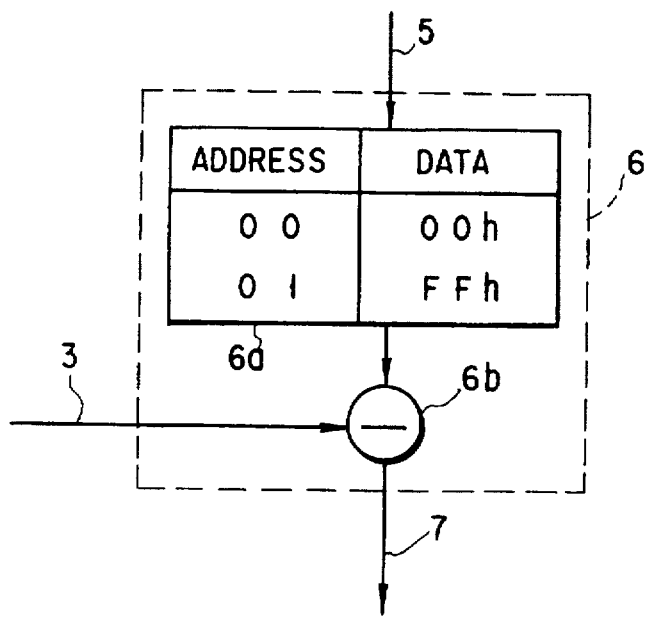
FIG. 12 is a diagram showing a concrete example of the construction of an error deriving circuit of FIG. 1.

In FIG. 12, the error deriving circuit 6 includes a bit conversion circuit 6a for converting output pixel data 5 (binary-coded data or multivalue-coded data) output from the threshold processing circuit 4 into 8-bit data, and a subtracter 6b for deriving an error or difference between the conversion data supplied from the bit conversion circuit 6a and the correction image signal 3 and an error signal 7 is output from the subtracter 6b.

For example, when output pixel data is binary-coded data, the bit conversion circuit 6a is constructed by a memory (ROM, for example) of 8 bits×2, and it produces conversion data "00h" for the threshold value Th(1)=7Fh when the binary-coded data is "0" and produces conversion data "FFh" when the binary-coded data is "1" ("h" indicates a hexadecimal value).

When the output pixel data is multivalue-coded data, the same converting process as described above may be performed by use of a plurality of memories to obtain conversion data corresponding to output levels.

Next, the error filter circuit 9 of FIG. 1 is explained.

A filter 9a based on the arithmetic operation on error and coefficient is the same as the conventional filter circuit, and as explained in the "Description of the Related Art", diffusion errors for the peripheral pixels are derived by multiplying weight coefficients KA, KB, KC, KD by an error used for binary-coding or multivalue-coding process for the target pixel. However, it is different from the related art in the filter coefficient and the coefficient is supplied from the filter coefficient generating circuit 8a of the filter parameter generating circuit 8. At this time, the coefficient generated from one of the random coefficient generating circuit 8b and random position coefficient generating circuit 8c is effectively used.

With the conventional error diffusion method, the filter coefficient is fixed, but in the filter coefficient generating circuit 8a, the coefficient value and the coefficient position can be randomly set.

In the random coefficient generating circuit 8b, it is necessary to generate the coefficients such that the total sum of the coefficients will become "1" at the time of generation of the random coefficient. For example, if the coefficients are KA, KB, KC, KD, the following equation (1) must be satisfied.

$$KA+KB+KC+KD=1 \quad (1)$$

The random number generation can be performed by use of an M series which will be described later, but it can also be performed by use of a function of random numbers used in a general computer or the like or another random generation circuit. For example, the coefficients can be obtained as indicated by the following equations (2).

$$KA=\text{rand}(\ );$$
$$KB=(1-KA)*\text{rand}(\ ); \quad (2)$$
$$KC=(1-KA-KB)*\text{rand}(\ );$$
$$KD=(1-KA-KB-KC)\ \text{rand}(\ )=1$$

where rand( )$\leq 1$ and indicates a random number generation function in the computer.

Further, the same filtering process as in the conventional case can be performed by outputting values set from the exterior as the coefficients KA, KB, KC, KD.

The random coefficient position generating circuit 8c is the same as a random mask position generating circuit 8f which will be described later, and it uses previously set filter coefficients k1, k2, k3, k4 instead of mask values m1, m2, m3, m4 and randomly allots the values to the coefficients KA, KB, KC, KD so as to randomly set the coefficient positions.

Next, the principle of the above error filter is explained with reference to FIGS. 13A, 13B, 13C.

Figure 13A:
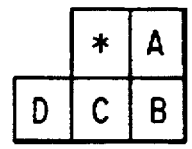
FIGS. 13A, 13B, 13C are diagrams showing the constructions of different error filters, for explaining the principle of the error filter.

FIG. 13A shows an error filter which is frequently used and diffuses errors of peripheral pixels A, B, C, D multiplied by the coefficients KA, KB, KC, KD when the filtering process by the arithmetic operation, for example, is performed for the target pixel "*" and the peripheral pixels A, B, C, D.

Likewise, in the case of the filtering process by the bit operation which will be described later, amounts obtained by the logical products of the errors of the peripheral pixels A, B, C, D and the masks MA, MB, MC, MD are diffused.

Figure 13B:
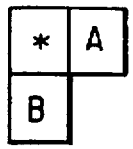
Figure 13C:
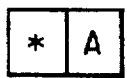

As another error filter, for example, as shown in FIG. 13B, the filtering process for the target pixel "*" is performed by use of one pixel before the target pixel "*" and one pixel selected from all of the lines, or as shown in FIG. 13C, the filtering process for the target pixel "*" is performed by use of the pixel before the target pixel "*".

The construction of the filter shown in FIG. 13A is generally frequently used, and in this embodiment, the explanation is made by taking only the construction of the error filter of FIG. 13A into consideration.

Next, the construction of the filter 9b based on the bit operation on error and mask shown in FIG. 1 is explained.

In FIG. 14, the filter 9b based on the bit operation includes a bit mask circuit 21, two adders 22a, 22b, and two flip-flop circuits (registers) 23a, 23b acting as delay circuits. The bit mask circuit 21 includes four bit mask sections 24a to 24d.

The error storage circuit 12 is constructed by a line buffer 12a which is a FIFO (First In-First Out) buffer.

The bit mask sections 24a to 24d are respectively supplied with masks MA, MB, MC, MD corresponding to bit mask values output from the filter mask generating circuit 8d of the filter parameter generating circuit 8 and an error 7 derived by the error deriving circuit 6.

The filter circuit 9b based on the bit operation on bit and mask in this embodiment uses an error filter as shown in FIG. 13A and derives a correction amount for the binary-coded error for four peripheral pixels including pixels directly adjacent to and lying on the same line as the target pixel and adjacent pixels on the next line, and mask values MA, MB, MC, MD on the four pixels are input from the filter mask generating circuit 8d of the filter parameter generating circuit 8 of FIG. 1.

The correction amounts to be diffused to the peripheral pixels A, B, C, D are derived by the bit mask sections 24a to 24d of FIG. 14. The logical products of the binary-coded error 7 and the mask values MA, MB, MC, MD are derived for each bit in AND circuits A10, A11, A12, A13 as shown in FIG. 15 and diffused as a correction amount eT (refer to FIG. 14) to a corresponding next pixel or a correction amount eN (refer to FIG. 14) for the pixel on the next line.

Next, the filter mask generating circuit 8d of the filter parameter generating circuit 8 of FIG. 1 is explained. The filter mask generating circuit 8d includes the random mask value generating circuit 8e and random mask position generating circuit 8f which are selectively operated by use of the switch 8j.

First, the random mask value generating circuit 8e is explained with reference to FIGS. 16 to 18.

FIG. 16 shows one example of a filter mask for the construction of the filter shown in FIG. 13A. The total sum of the bit mask values generated by the random mask value generating circuit 8e for diffusing the entire error to neighboring pixels must be set equal to the maximum possible error value and it is necessary to satisfy the following relation (3) for the maximum error (255) of eight bits, for example, as shown in FIG. 16.

$$MA+MB+MC+MD=\lceil 11111111 \rfloor \quad (3)$$

The random mask value generating circuit 8e is a circuit for generating mask values MA, MB, MC, MD to satisfy the above condition and the embodiment thereof is shown in FIG. 17.

In FIG. 17, M1, M2, M3 are maximum period pseudo random series generating circuits for generating maximum period pseudo random series called M series and having a period (2m−1) for the degree m. Further, logical inversion processing sections N1, N2, N3 effect the logical inversion process for each bit and logical product processing sections L1, L2 perform the process for deriving the logical product for each bit. In FIG. 17, the M series with the degree 8 is used, but it is possible to generate M series with the degree of 9 or more and selectively use only eight bits in the M series.

Further, as shown in FIG. 18, it is possible to divide the eight bits into M series of M11 (third degree), M12 (third

15 degree) and M13 (second degree) and use the M series as a combination of degrees lower than 8. Further, M1, M2, M3 can be generated with different degrees (for example, degrees 8, 9, 10) or the same degree by use of different characteristic polynomials which will be described later and the same M series can be generated by use of three shifts that the resultant series are independent from one another.

The error is diffused without leakage by use of the masks MA, MB, MC, MD generated by the construction shown in FIG. 17 to satisfy the equation (3).

Figure 19:
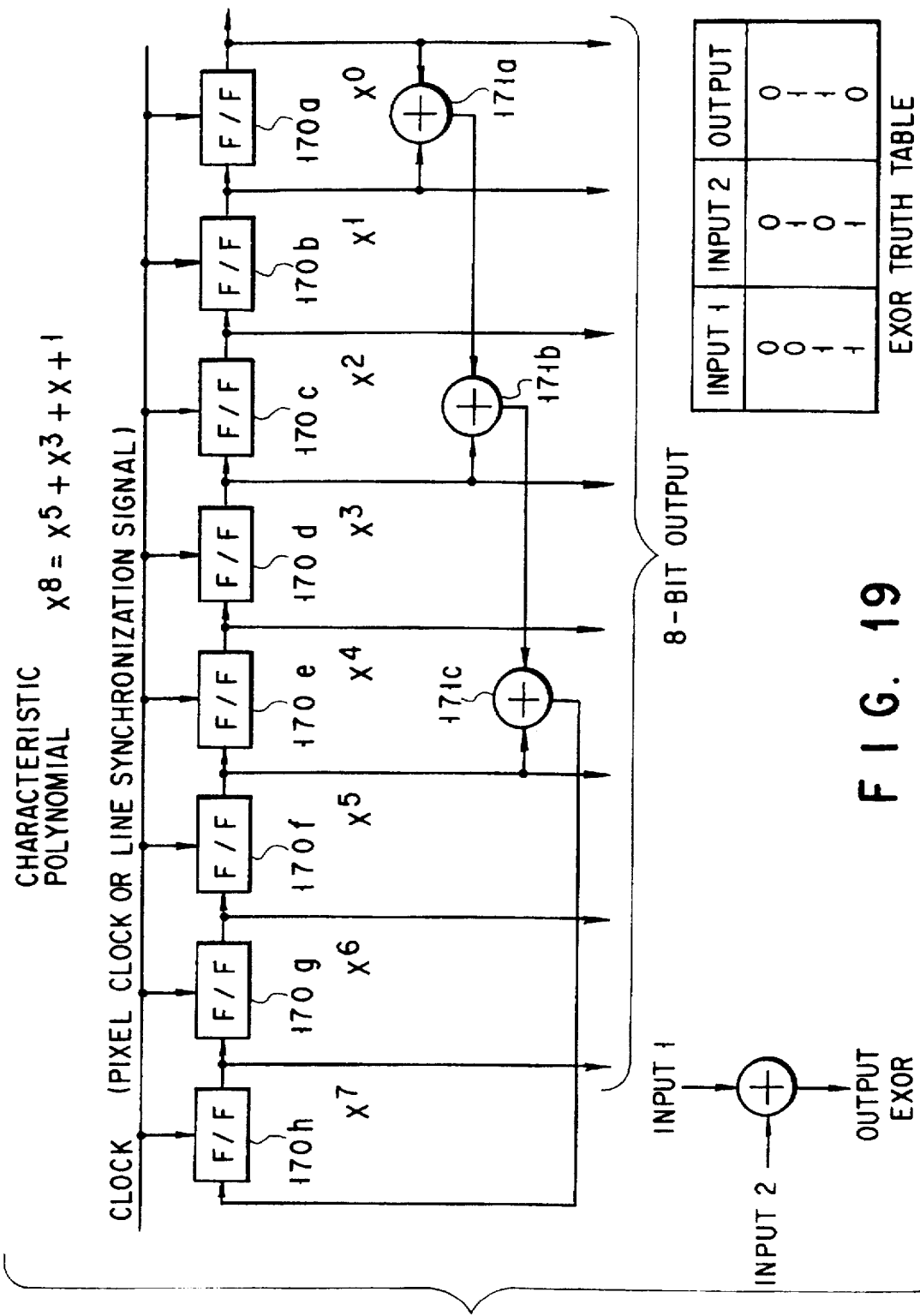
FIG. 19 is a diagram schematically showing another construction of the random mask value generating circuit of FIG. 1 in a case where a pseudo random series is used.

Another concrete example of the M-series generating circuit is shown in FIG. 19. This embodies the characteristic polynomials expressed by the following equation (4).

$$x^8 = X^5 + X^3 + X^1 + X^0 \quad (4)$$

The M-series generating circuit shown in FIG. 19 includes shift registers (constructed by flip-flop circuits) 170a to 170h and exclusive OR circuits 171a, 171b, 171c and the initial value of the shift registers 170a to 170h is set to a value other than "0", values output from the shift registers 170a to 170h or mask values are generated at random (in a spurious manner) once in one period (255 clocks) for the values of "01h" to "FFh" by shifting the bits of the shift registers 170a to 170h corresponding to the bits of 8-bit data to the right in synchronism with a control clock signal input from the control clock generating circuit 14. The order in which the outputs appear is changed if another polynomial is used.

Figure 20:
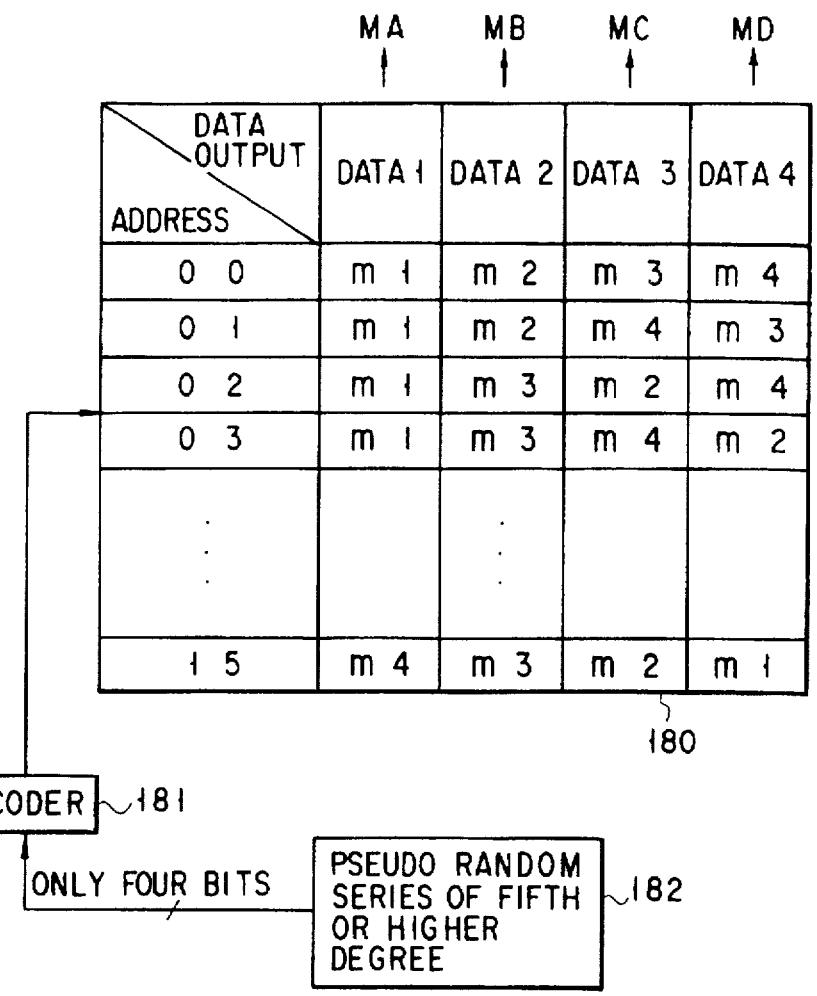
FIG. 20 is a diagram schematically showing the construction of a random mask position generating circuit of FIG. 1.

Next, a method for randomly setting the mask position is explained. The random mask position generating circuit 8f is used to perform the method for randomly allotting the previously set four filter masks. For example, four mask values shown in FIG. 16 are arranged in the order of m1, m2, m3, m4 from the above in FIG. 16, a look-up table 180 of 16×32 shown in FIG. 20 is formed, data constructed by desired four bits of random data generated from a pseudo random series generating circuit 182 for generation of pseudo random series with the fifth or higher degree is decoded by a decoder 181, an output of the decoder is used as an address to access the look-up table 180, and the contents (data) of the table corresponding to the address are set as MA, MB, MC, MD so as to permit the mask position to be randomly set.

In this example, a method of randomly setting the mask position is explained, but a method for randomly setting the coefficient position in the random coefficient position generating circuit 8c can be performed in the same manner.

Next, the control clock generating circuit 14 of FIG. 1 is explained. The control clock generating circuit 14 generates a control clock signal for controlling the randomly setting operation of the filter parameter generating circuit 8 and includes a line control clock generating circuit 14a and pixel control clock generating circuit 14b, and one of the circuits is selectively set operative by use of a switch 14c.

Figure 21A:
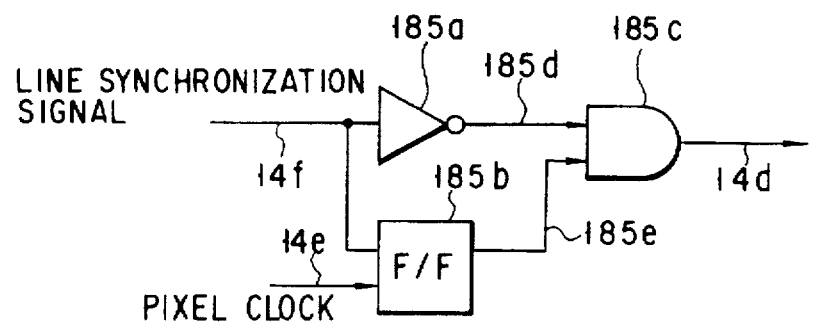
FIG. 21A is a diagram showing a concrete example of the construction of a line control clock generating section, for explaining a control clock generating circuit of FIG. 1.
Figure 21B:
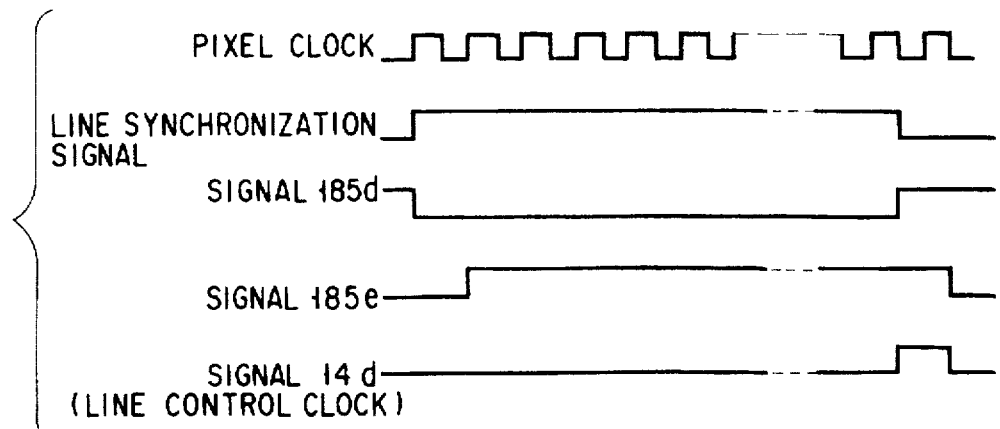
FIG. 21B is a timing chart for explaining the control clock generating circuit of FIG. 1.
Figure 21C:
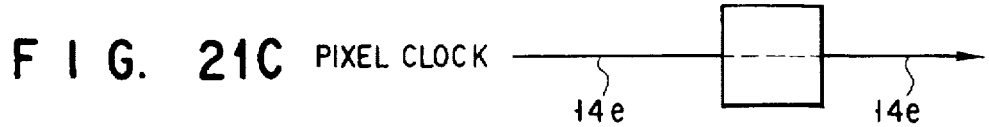
FIG. 21C is a diagram showing a concrete example of the construction of a pixel control clock generating section, for explaining the control clock generating circuit of FIG. 1.

FIGS. 21A, 21B, 21C are diagrams for illustrating the control clock generating circuit 14, FIG. 21A shows a concrete example of the line control clock generating circuit 14a, and FIG. 21B shows the timings of signals output from various sections in the construction of FIG. 21A.

A line synchronization signal 14f (FIG. 21B) is logically inverted by a logic inversion circuit 185a (refer to a signal 185d in FIG. 21B) and then input to an AND circuit 185c. Further, the line synchronization signal 14f is delayed by one pixel clock in a flip-flop circuit 185b (refer to a signal 185e in FIG. 21B) and then input to the AND circuit 185c. The logical product of the two inputs to the AND circuit 185c is derived and a pulse of one clock of the pixel clock 14e is

16 output at the time of completion of one line as a line control clock signal 14d (refer to FIG. 21B).

FIG. 21C shows a concrete example of the construction of the pixel control clock generating circuit 14b and outputs a pixel clock 14e itself supplied from a scanner or the like as a pixel control clock signal as shown in FIG. 21C.

The control clock signal output from the control clock generating circuit 14 is a control signal for shifting the randomization of the filter parameter (coefficient, coefficient position, mask value, mask position) of the filter parameter generating circuit 8 for each pixel or for every preset number of pixels based on the pixel control clock or for each line or for every preset number of lines based on the line control clock.

One of the advantages obtained by shifting the randomization of the filter parameter for each line or for every preset number of lines is that the number of bits of an error buffer required can be controlled (for example, 9-bit FIFO).

Next, the external interface circuit 15 of FIG. 1 is explained. The external interface circuit 15 is an external input/output interface (for example, touch panel, LCD display, keyboard, CRT display) which permits the user to set the best combination of the above circuits from the exterior by considering the image quality, processing speed, cost and the like.

The external interface circuit 15 decodes information set from the exterior to set the filter coefficient and mask and control the switches 2c, 4c, 9c, 9d, 8i, 8j, 14c. For example, when the "correction circuit based on the arithmetic operation" is set as the error correction processing circuit, the switch 2c is connected to the correction circuit 2a based on the arithmetic operation, and when the "correction circuit based on the bit operation" is set, the switch 2c is connected to the correction circuit 2b based on the bit operation. Likewise, when the "threshold processing circuit based on the comparing operation" is selected as the threshold processing circuit, the switch 4c is connected to the threshold processing circuit 4a based on the comparing operation, and when the "threshold processing circuit based on the bit operation" is selected, the switch 4c is connected to the threshold processing circuit 4b based on the bit operation. In the filter process, when the "filtering by the arithmetic operation on error and coefficient" is selected, the switches 9c, 9d are connected to the filter 9a based on the arithmetic operation, and when the "filtering by the bit operation on error and mask" is selected, the switches 9c, 9d are connected to the filter 9b based on the logical operation.

Further, in a case where the filter 9a based on the arithmetic operation is selected, the switch 8i is connected to the random coefficient generating circuit 8b when the "random filter coefficient" is selected, and the switch 8i is connected to the random coefficient position generating circuit 8c when the "random filter coefficient position" is selected.

On the other hand, in a case where the filter 9b based on the logical operation is selected, the switch 8j is connected to the random mask value generating circuit 8e when the "random mask value" is selected, and the switch 8j is connected to the random mask position generating circuit 8f when the "random mask position" is selected.

Likewise, in the case of randomization for each pixel, the switch 14c of the control clock generating circuit 14 is connected to the pixel control clock generating circuit 14b, and in the case of randomization for each line unit, the switch 14c is connected to the line control clock generating circuit 14a.

That is, the above circuits can be adequately and selectively set by use of the switches.

Next, the basic operation of this embodiment with the construction of FIG. 1 is explained. For example, input pixel data 1 read by an input device such as a scanner is subjected to the correction process by use of a correction amount eP from the preceding line and a correction amount eT from the preceding pixel on the same line in the error correction circuit 2 and is then output as a correction signal 3 to the threshold processing circuit 4 and error deriving circuit 6.

The threshold processing circuit 4 supplied with the correction signal 3 converts the correction signal 3 into binary-coded data or multivalue-coded data 5 (for example, a one-bit output in the case of binary-coded data) according to the level of the output device and then outputs the data to an output device such as a printer, display device and the error deriving circuit 6.

The error deriving circuit 6 derives an error 7 of the target pixel from the correction signal 3 and the output pixel data 5 which is binary-coded data or multivalue-coded data and outputs the error to the error filter circuit 9. That is, the error deriving circuit 6 converts binary-coded data or multivalue-coded data which is the output pixel data 5 into data having the same number of bits as the correction signal 3 and outputs a difference between the converted data and the correction signal 3 to the error filter circuit 9 as the error 7 of the target pixel.

The error filter circuit 9 derives an error correction amount to be diffused to the peripheral pixels from the error 7 supplied from the error deriving circuit 6 and a filter parameter generated from the filter parameter generating circuit 8.

The parameter generating circuit 8 makes it possible to randomly set the parameter in each peripheral pixel and randomly distribute the error amount by random setting of the value and arrangement of the parameter, thereby making it possible to reproduce smooth gradation by reducing the texture which appears when a constant coefficient is used.

As described before, the correction process, threshold process, error filter process, filter parameter generating process can be selected from the exterior and controlled via the external interface 15.

Next, a possible combination of the circuits is selectively made in the construction of FIG. 1 and a binary-coding image processing apparatus according to a second embodiment of this invention is explained with reference to FIG. 22.

The image processing apparatus receives image data obtained by reading an original by a reading device such as an image scanner as digital data (density data) of eight bits for each pixel, for example, and binary-coding the input data.

That is, the image processing apparatus includes an error correction circuit 2a (a concrete example of the construction thereof is shown in FIG. 2A) based on the arithmetic operation, a threshold processing circuit 4a based on the comparing operation, an error deriving circuit 6 (a concrete example of the construction thereof is shown in FIG. 12), a filter 9b based on the bit operation on error and mask, a random mask value generating circuit 8e, and an error storage circuit (error buffer) 12. The error deriving circuit 6 includes an output value storage circuit 6a and an error deriving circuit 6b.

The error deriving circuit 2a based on the arithmetic operation adds input pixel data (for example, 8-bit digital image data read by use of a scanner or the like) to a correction amount eT diffused from the preceding pixel as described before (refer to FIG. 2A), supplies the correction signal to the next stage in synchronism with the image clock 14e, adds a correction amount eP of the preceding line corresponding to the target pixel to the correction signal, and then outputs a correction signal 3.

The threshold processing circuit 4a based on the comparing operation includes a comparator. An example of a method for selecting the threshold value thereof is explained below. The gradation number (level number) of an output device in this embodiment is set to 2. One method for determining the binary-coding threshold value is indicated in the equations (5).

$$ST=(2n-1)/(m-1)$$

$$TST=ST/2 \qquad (5)$$

$$Th(i)=i*ST-TST$$

where n is the bit number of the input pixel data, m is the level number of the output device, and $Th(i)$ is an i-th threshold value ($i=1, 2, 3, ---(m-1)$).

If the above equations are used and $m=2$ and $n=8$, $Th(1)$ becomes 7Fh ("h" indicates a hexadecimal value).

The threshold processing circuit 4a based on the comparing operation compares the correction signal 3 with the threshold value $Th(1)$, sets output pixel data 5 which is binary-coded data to "1" (black pixel) when the correction signal 3 is equal to or larger than $Th(1)$, and sets the output pixel data to "0" (white pixel) when the correction signal 3 is smaller than $Th(1)$.

The error correction circuit 6 is a circuit for deriving a binary-coded error by the threshold processing and derives an error amount based on the correction signal 3 and output pixel data 5 of binary-coded data (refer to FIG. 12 for the detail explanation thereof).

The random mask value generating circuit 8a is a circuit for randomly generating filter masks. The circuit generates mask values MA, MB, MC, MD in synchronism with a control clock output from a pixel control clock generating section 14b under a condition that the error will not leak (refer to FIGS. 16 to 19 for the detail explanation thereof).

The filter 9b based on the bit operation on error and mask is a filter circuit based on the bit operation on the mask values MA, MB, MC, MD and the error (refer to FIGS. 14 and 15 for the detail explanation thereof).

The correction amount eT for the adjacent pixel among the filter output is used for correction of the next pixel by the error correction circuit 2a based on the arithmetic operation, and the correction amount eN for the next line is temporarily stored in the error storage circuit 12 and used as a correction amount for a corresponding pixel on the next line.

With the above construction, the error filter circuit and random mask generating circuit are different from the conventional error diffusion system for proportionally diffusing the error by use of a constant coefficient, and since the error filter itself is based on the logical operation (logical product) on the mask and error, random diffusion becomes possible and the texture of the output image can be reduced. By randomization of the mask, the degree of randomization of diffusion is enhanced and the texture can be reduced.

Further, since the filter construction and the construction of the random mask generating circuit, that is, the construction of the filter 9b based on the bit operation on error and mask and the random mask value generating circuit 8e are realized based on the simple logical operation, it becomes possible to simplify the construction of the circuit and enhance the operation speed thereof.

Figure 22:
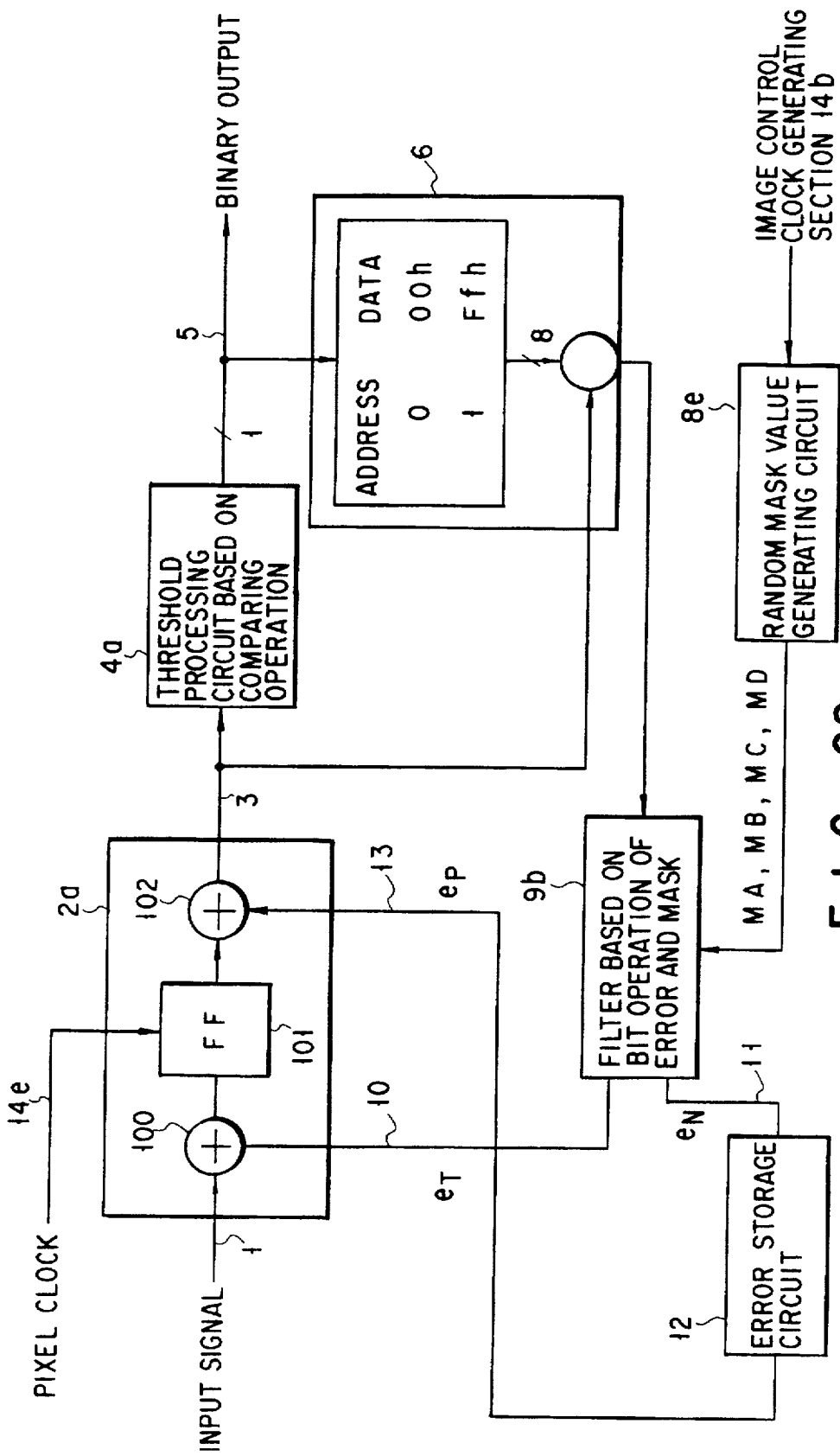
FIG. 22 is a diagram schematically showing the construction of an image processing apparatus according to a second embodiment of this invention.

With the construction shown in FIG. 22, the pixel clock 14e is used as the control clock for randomization, but if the clock is interrupted, the operation using a constant mask can be performed, and it becomes possible to control the maximum bit number required by the error storage circuit as described before by using the line control clock.

Next, another possible combination of the circuits is selectively made in the construction of FIG. 1 and an image processing apparatus according to a third embodiment of this invention is explained with reference to FIG. 23.

Figure 23:
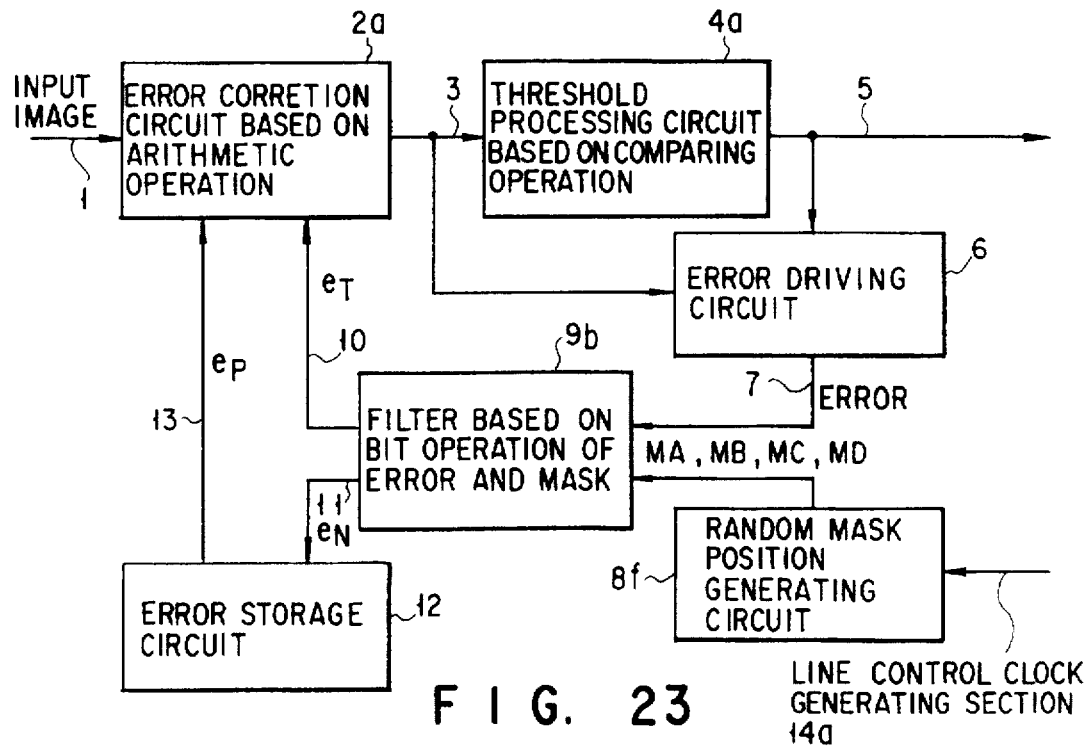
FIG. 23 is a diagram schematically showing the construction of an image processing apparatus according to a third embodiment of this invention.

The construction of FIG. 23 is different from that of FIG. 22 in that a random mask position generating circuit 8f which is controlled by a line control clock is used instead of the random mask value generating circuit 8e (refer to FIG. 20 for the detail explanation for the random mask value generating circuit 8f).

Like the case of the construction of FIG. 22, the construction of FIG. 23 permits the texture to be reduced.

Further, since the filter construction and the construction of the random mask generating circuit, that is, the construction of the filter 9b based on the bit operation on error and mask and the random mask position generating circuit 8f are realized based on the simple logical operation, it becomes possible to simplify the construction of the circuit and enhance the operation speed thereof.

Next, still another possible combination of the circuits is selectively made in the construction of FIG. 1 and an image processing apparatus according to a fourth embodiment of this invention is explained with reference to FIG. 24.

In the fourth embodiment, an image obtained by reading an original by a reading device such as an image scanner is input as input pixel data 1 of 8-bit digital data (density data) for each pixel, for example, and binary-coded.

In FIG. 24, the image processing apparatus according to the fourth embodiment includes an error correction circuit 2b based on the bit operation, threshold processing circuit 4a based on the comparing operation, error deriving circuit 6, filter 9a based on the arithmetic operation on error and mask, random coefficient value generating circuit 8b, and error storage circuit (error buffer) 12.

As described before, the error correction circuit 2b based on the bit operation corrects the input pixel data 1 (for example, 8-bit digital image data read by a scanner) based on a correction amount eT diffused from the preceding pixel and a correction amount eP diffused from the preceding line by use of a correction circuit based on the bit operation and then outputs a correction signal 3 (refer to the explanation with reference to FIG. 3A).

The threshold processing circuit 4a based on the comparing operation is constructed by a comparator, and an example of a method for selecting the threshold value thereof is explained below. The gradation number (level number) of an output device in this embodiment is set to 2.

The threshold processing circuit 4a based on the comparing operation compares the correction signal 3 with the threshold value Th(1), sets output pixel data 5 which is binary-coded data to "1" (black pixel) when the correction signal 3 is equal to or larger than Th(1), and sets the output pixel data 5 to "0" (white pixel) when the correction signal 3 is smaller than Th(1).

The error correction circuit 6 is a circuit for deriving a binary-coded error by the threshold processing circuit 4a based on the comparing operation and derives an error amount based on the correction signal 3 and output pixel data 5 of binary-coded data (refer to FIG. 12 for the detail explanation thereof).

The random coefficient value generating circuit 8b is a circuit for randomly generating filter coefficients as described before. The circuit generates coefficients KA, KB, KC, KD in synchronism with a line control clock output from a line control clock generating section 14a under a condition that the error will not leak.

The filter 9a based on the arithmetic operation on error and mask is a conventional error filter circuit based on the arithmetic operation (multiplication) on the coefficients KA, KB, KC, KD and the error 7.

The correction amount eT for the adjacent pixel among the output of the filter 9a is used for correction of the next pixel by the error correction circuit 2b, and the correction amount eN for the next line is temporarily stored in the error storage circuit 12 and used as a correction amount for a corresponding pixel on the next line.

With the construction shown in FIG. 24, the error filter circuit 2b based on the bit operation is attained by a combination of the logical sum for each bit and the conventional arithmetic operation unlike the conventional error correction circuit based on a correction amount proportionally varying with the coefficient using the set filter models, and as described before, since it has the same effect as that obtained in a case wherein the filter coefficient and position are randomly set, the texture of the output image can be reduced.

With the construction shown in FIG. 24, the line control clock is used as a control clock for randomization, but if the clock is interrupted, the operation using a constant coefficient value can be performed, and it becomes possible to use pixel clock 14e as the randomization control clock.

Next, still another possible combination of the circuits is selectively made in the construction of FIG. 1 and an image processing apparatus according to a fifth embodiment of this invention is explained with reference to FIG. 25.

In the fifth embodiment of FIG. 25, an image obtained by reading an original by a reading device such as an image scanner is input as input pixel data 1 of 8-bit digital data (density data) for each pixel, for example, and binary-coded.

An image processing apparatus according to the fifth embodiment includes an error correction circuit 2a based on the arithmetic operation, threshold processing circuit 4b based on the bit operation, error deriving circuit 6, filter 9a based on the arithmetic operation, random coefficient position generating circuit 8c, and error storage circuit (error buffer) 12.

As described before, the error correction circuit 2a based on the arithmetic operation corrects the input pixel data 1 (for example, 8-bit digital image data read by a scanner) based on a correction amount eT diffused from the preceding pixel and a correction amount eP diffused from the preceding line by use of a correction circuit based on the arithmetic operation and then outputs a correction signal 3.

As described before, the threshold processing circuit 4b based on the bit operation is constructed to effect the bit operation on the threshold value and the correction signal 3 after correction and output pixel data 5 which is binary-coded data.

As described before, the error correction circuit 6 is a circuit for deriving a binary-coded error by the threshold processing and derives an error amount based on the correction signal 3 and output pixel data 5 of binary-coded data.

As described before, the random coefficient position generating circuit 8c is a circuit for randomly allotting filter coefficients. The circuit generates coefficients KA, KB, KC, KD in synchronism with a pixel clock output from a pixel control clock generating section 14b under a condition that the error will not leak, and the operation thereof is similar to that of the random mask position generating circuit 8f shown in FIG. 20.

The error filter 9a is a conventional error filter circuit based on the arithmetic operation (multiplication) on the error 7 and coefficients KA, KB, KC, KD.

The correction amount eT for the adjacent pixel among the output of the filter 9a is used for correction of the next pixel by the error correction circuit 2a, and the correction amount eN for the next line is temporarily stored in the error storage circuit 12 and used as a correction amount for a corresponding pixel on the next line.

With the construction of the fifth embodiment, the threshold processing circuit 4b based on the bit operation is an output determining circuit based on the threshold operation using the logical product for each bit unlike the conventional error processing circuit 4a based on the comparing operation, and it has the same effect as that obtained by dynamic variation or randomization of the threshold value and can reduce the texture of the output image. Further, since the process is attained by a simple logical operation, the threshold process can be made simple and performed at high speed.

With the construction shown in FIG. 25, the pixel clock 14e is used as a control clock for randomization, but if the clock is interrupted, the operation using a constant coefficient can be effected, and it becomes possible to use a line control clock output from the line control clock generating section 14a.

In the second to fifth embodiments, a combination of the error filter circuit 9b based on the bit operation and the random mask value generating circuit 8e, a combination of the error filter circuit 9b based on the bit operation and the random mask position generating circuit 8f, a combination of the error correction circuit 2b based on the bit operation and the random coefficient value generating circuit 8b, and a combination of the threshold processing circuit 4b based on the bit operation and the random coefficient position generating circuit 8c in the construction of FIG. 1 are explained, but two or more of the above combinations may be combined. Further, for example, it is possible to combine the error correction circuit 2b based on the bit operation used instead of the conventional error correction circuit and the threshold processing circuit 4b based on the bit operation used instead of the conventional threshold processing circuit, and in this case, the texture of the output image can be reduced as in the former case.

In the second to fifth embodiments, a case wherein binary-coded data is used as the output pixel data 5 is explained, but in the case of multivalue-coded data, the process can be easily coped with by setting a plurality of output levels of the threshold processing circuit 4 and error deriving circuit 6 as described before.

As described above, according to the first to fifth embodiments, when the pixel data 1 of a pixel in the image to be processed is corrected by use of the correction amounts eT, eP diffused from the peripheral pixels of the pixel in the error correction circuit 2b, the logical operation for each bit unit is performed to perform the error correction process so as to attain the effect that the correction amount and position diffused from the peripheral pixels can be dynamically changed and the texture can be reduced in comparison with a case wherein the conventional error correction process by the arithmetic operation is effected (error correction circuit 2a).

Further, the same effect as the dynamic variation or randomization of the threshold value can be attained and the texture of an output duplicate image can be reduced by performing the output determining process for creating binary-coded or multivalue-coded pixel data 5 of the duplicate image of the to-be-processed image in the threshold processing circuit 4b by performing the bit operation using the logical product for each bit on the correction signal 3 obtained by correcting the pixel data 1 and output from the error correction circuit 2. Further, since the process by the bit operation is performed by a simple logical operation, the circuit can be made simple in construction and the operation speed thereof can be enhanced in comparison with the conventional threshold processing by the comparing operation.

When the error 7 of the pixel data 5 output as pixel data of the duplicate of a to-be-processed image and the correction signal 3 obtained by correcting the pixel data 1 of a target pixel in the error correction circuit 2 and output therefrom is diffused to the peripheral pixels, more effective random error diffusion can be attained, the texture can be reduced and the circuit construction can be made simple by performing the diffusion process of the error 7 to the peripheral pixels by the bit operation in the filter 9b based on the random position of fixed mask value generated from the random mask position generating circuit 8f or the random mask value generated from the random mask value generating circuit 8e.

When the error 7 with respect to the correction signal 3 is diffused to the peripheral pixels, more effective random error diffusion can be attained, the texture can be reduced and the circuit construction can be made simple by performing the diffusion process of the error 7 to the peripheral pixels by the arithmetic operation in the filter 9a based on the random position of the fixed random coefficient generated from the random coefficient position generating circuit 8c or the random filter coefficient generated from the random coefficient generating circuit 8b.

Further, when the random filter parameter such as the filter coefficient, coefficient position, mask value, mask position is generated in the filter parameter generating circuit 8, the filter parameter generating timing can be shifted for each pixel or for each line based on the timing of one of the pixel clock 14e and line synchronization signal 14d and the degree of randomization of the filter parameters can be enhanced.

Since the filter coefficient and mask value can be set and the positions of the switches 2c, 4c, 9c, 9d, 8i, 8j, 14c can be selectively set based on the content set by the user by use of the external interface circuit 15, the user can select the combination of the circuits according to the purpose of application by taking the image quality, circuit scale, cost, processing speed and the like into consideration.

As the combination of the circuits which can most significantly realize the above effect, a combination of the error correction circuit 2b based on the bit operation, threshold processing circuit 4b based on the bit operation, error deriving circuit 6, filter mask generating circuit 8d, filter 9b based on the bit operation on error and mask, error storage circuit 12, and pixel control clock generating section 14b can be considered, for example.

As described above, according to this invention, an image processing apparatus which can reduce the texture of the output image, simplify the error diffusion process and enhance the operation speed thereof can be provided.

What is claimed is:

1. An image processing apparatus comprising:
    means for correcting a first image data of a target pixel corresponding to a correction amount and outputting a second image data;
    means for generating a third image data on the basis of the second image data and a preset threshold value, the third image data having a gradation value less than one of the second image data;
    means for comparing the second image data with the third image data to output a difference value having first bit data therebetween;

means for generating random mask values having second bit data to perform the random mask processing for peripheral pixels of the target pixel to diffuse the difference value to the peripheral portion of the target pixel; and means for deriving the correction amount by the logical operation for each bit unit on the first bit data of the difference value and the second bit data of the random mask values so as to supply the correction amount to the correcting means.

2. An image processing apparatus according to claim 1, wherein the deriving means includes;

means for generating random coefficient values to perform the random filtering process for peripheral pixels of the target pixel to diffuse the difference value to the peripheral portion of the target pixel;

means for selecting and supplying the random mask values to the correcting means when the correcting means performs logical operation; and means for selecting and supplying the random coefficient values to the correcting means when the correcting means performs arithmetic operation.

3. An image processing apparatus according to claim 1, wherein the mask value generating means includes means for generating a plurality of random coefficient values used as the mask value.

4. An image processing apparatus according to claim 3, wherein the mask value generating means includes means for calculating the plurality of mask values by generating pseudo random series of maximum period.

5. An image processing apparatus according to claim 3, wherein the mask value generating means includes means for calculating the plurality of mask values by generating pseudo random series of maximum period constructed by a combination of degrees smaller than 8 obtained by dividing eight bits into a plurality of series.

6. An image processing apparatus according to claim 3, wherein the mask value generating means includes a plurality of flip-flop circuits having input sections and output sections serially connected and constructed corresponding to preset polynomials and a plurality of exclusive OR circuits connected to the flip-flop circuits.

7. An image processing apparatus according to claim 1, wherein the mask value generating means includes means for generating a plurality of random mask position information items.

8. An image processing apparatus according to claim 7, wherein the mask value generating means includes means for randomly generating a mask position which is position information for indicating one of the peripheral pixels of the target pixel of the first image which is to be subjected to the mask processing.

9. An image processing apparatus according to claim 1, wherein the mask value generating means includes means for generating a new mask value each time one pixel of the first image data is supplied from the exterior.

10. An image processing apparatus according to claim 1, wherein the mask value generating means includes means for generating a new mask value each time one line of the first image data is supplied from the exterior.

11. An image processing apparatus according to claim 1, wherein the correction amount generating means includes means for generating a second correction amount for correction of a pixel adjacent to the target pixel and a third correction amount for correction of a pixel on the next line of the target pixel.

12. An image processing apparatus comprising:

means for correcting a first image data of a target pixel to the operation process for each bit unit corresponding to a correction amount and outputting a second image data;

means for generating a third image data on the basis of the second image data and preset threshold value, the third image data having a gradation value less than one of the second image data;

means for comparing the second image data with the third image data and outputting a difference value having first bit data therebetween;

means for generating random coefficient values having second bit data to perform random filtering process which randomly diffuses the difference value to the peripheral portion of the target pixel;

means for deriving the correction amount by the logical operation for each bit unit on the first bit data of the difference value and the second bit data of the random coefficient values and supplying the correction amount to the correcting means.

13. An image processing apparatus according to claim 12, wherein the deriving means includes means for supplying a new correction value each time one pixel of the first image is supplied from the exterior.

14. An image processing apparatus according to claim 12, wherein the deriving means includes means for supplying a new correction value each time one line of the first image is supplied from the exterior.

15. An image processing apparatus, comprising:

means for correcting a fist image data of a target pixel corresponding to a correction amount and outputting a second image data;

means for generating a third image data corresponding to the second image data and a present threshold value, the third image data having a gradation value less than one of the second image data;

means for comparing the second image data with the third image data to output a difference value having first bit data therebetween;

means for generating a mask value having second bit data; and means for performing logical operation for each bit unit on the fist bit data of the difference value and the second bit data of the mask value so as to derive and supply the correction amount to the correcting means, thereby the correction amount of which its value is sufficiently randomized by a logical operation for each bit unit is supplied to peripheral pixels of the target pixel so as to reduce texture due to regulated process.

* * * * *